United States Patent
Park

(10) Patent No.: US 12,040,930 B2
(45) Date of Patent: Jul. 16, 2024

(54) METHOD AND DEVICE FOR TRANSMITTING AND RECEIVING UPLINK CONTROL INFORMATION

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 419 days.

(21) Appl. No.: 17/421,707

(22) PCT Filed: Jan. 7, 2020

(86) PCT No.: PCT/KR2020/000240
§ 371 (c)(1),
(2) Date: Jul. 8, 2021

(87) PCT Pub. No.: WO2020/145610
PCT Pub. Date: Jul. 16, 2020

(65) Prior Publication Data
US 2022/0086032 A1    Mar. 17, 2022

(30) Foreign Application Priority Data

Jan. 9, 2019 (KR) .......... 10-2019-0002975
Jan. 18, 2019 (KR) .......... 10-2019-0007119
Jan. 6, 2020 (KR) .......... 10-2020-0001549

(51) Int. Cl.
*H04L 27/26* (2006.01)
*H04L 5/00* (2006.01)
(Continued)

(52) U.S. Cl.
CPC ........ *H04L 27/2678* (2013.01); *H04L 5/0012* (2013.01); *H04W 72/0446* (2013.01); *H04W 72/21* (2023.01); *H04W 72/53* (2023.01)

(58) Field of Classification Search
CPC ............. H04L 27/2678; H04L 5/0012; H04W 72/0046; H04W 72/21
See application file for complete search history.

(56) References Cited

U.S. PATENT DOCUMENTS

2013/0258874 A1   10/2013   Khoshnevis et al.
2013/0258954 A1   10/2013   Khoshnevis et al.
(Continued)

OTHER PUBLICATIONS

3GPP, "3rd Generation Partnership Project; Technical Specification Group Radio Access Network; NR; Physical layer procedures for control (Release 15)," 3GPP TS38.213 V15.3.0, Sep. 2018 (Year: 2018).*

(Continued)

*Primary Examiner* — Jamal Javaid
*Assistant Examiner* — Ryan C Kavleski
(74) *Attorney, Agent, or Firm* — IP Legal Services, LLC

(57) ABSTRACT

Provided are a method and a device for transmitting and receiving uplink control information The method may include: receiving configuration information about a plurality of PUCCH resources allocated to the transmission of a plurality of UCIs in one slot; determining one PUCCH resource from among the plurality of PUCCH resources on the basis of the priority level of each of the plurality of UCIs; and multiplexing the plurality of UCIs with the one PUCCH resource and transmitting same.

15 Claims, 13 Drawing Sheets

(51) Int. Cl.
*H04W 72/0446* (2023.01)
*H04W 72/21* (2023.01)
*H04W 72/53* (2023.01)

(56) References Cited

U.S. PATENT DOCUMENTS

| | | |
|---|---|---|
| 2013/0258973 A1 | 10/2013 | Khoshnevis et al. |
| 2014/0369294 A1 | 12/2014 | Seo et al. |
| 2016/0183244 A1 | 6/2016 | Papasakellariou |
| 2017/0006601 A1 | 1/2017 | Seo et al. |
| 2017/0303271 A1 | 10/2017 | Seo et al. |
| 2018/0145817 A1 | 5/2018 | Papasakellariou |
| 2018/0249460 A1 | 8/2018 | Seo et al. |
| 2019/0313342 A1* | 10/2019 | Papasakellariou .. H04W 52/325 |
| 2020/0092878 A1 | 3/2020 | Seo et al. |
| 2020/0196343 A1* | 6/2020 | Marinier ............... H04L 1/1896 |
| 2020/0287694 A1 | 9/2020 | Papasakellariou |
| 2021/0120547 A1 | 4/2021 | Seo et al. |
| 2021/0360614 A1* | 11/2021 | Baldemair ........ H04W 72/1263 |
| 2022/0103330 A1* | 3/2022 | Li .......................... H04L 1/1812 |

OTHER PUBLICATIONS

Huawei et al., "Review Summary for AI 7.1.3.2 related to long PUCCH", R1-1811970, 3GPP TSG RAN WG1 Meeting #94bis, Chengdu, China, Sep. 8-12, 2018 (Year: 2018).*

3GPP, "3rd Generation Partnership Project; Technical Specification Group Radio Access Network; NR; Physical layer procedures for control (Release 15)", 3GPP TS 38.213 V15.3.0, Sep. 2018.

Huawei et al., "Review Summary for AI 7.1.3.2 related to long PUCCH", R1-1811970, 3GPP TSG RAN WG1 Meeting #94bis, Chengdu, China, Sep. 8-12, 2018.

* cited by examiner

METHOD AND DEVICE FOR TRANSMITTING AND RECEIVING UPLINK CONTROL INFORMATION

CROSS REFERENCE TO RELATED APPLICATIONS

This application is a National Stage Patent Application of PCT International Patent Application No. PCT/KR2020/000240 (filed on Jan. 7, 2020) under 35 U.S.C. § 371, which claims priority to Korean Patent Application Nos. 10-2019-0002975 (filed on Jan. 9, 2019), 10-2019-0007119 (filed on Jan. 18, 2019), and 10-2020-0001549 (filed on Jan. 6, 2020), the teachings of which are incorporated herein in their entireties by reference.

TECHNICAL FIELD

The present disclosure relate to a method and an apparatus for transmitting and receiving uplink control information in a next-generation radio access network (hereinafter, referred to as new radio (NR)).

BACKGROUND ART

Recently, 3$^{rd}$ generation partnership project (3GPP) has approved "Study on New Radio Access Technology" that is a study item for researches on next-generation radio access technologies (in other words, 5G radio access technologies). On the basis of this, radio access network working group 1 (RAN WG1) introduced designs for new radio (NR), such as a frame structure, channel coding & modulation, waveform & multiple access schemes, and the like. It is required to design the NR to satisfy not only an improved data transmission rate higher than that of LTE but also various QoS requirements required for individual usage scenarios.

The representative usage scenarios of the NR include enhancement Mobile BroadBand (eMBB), massive Machine Type Communication (mMTC), and Ultra Reliable and Low Latency Communications (URLLC). It is required to design frame structures to be more flexible than LTE in order to satisfy requirements of each of the representative usage scenarios.

The individual usage scenarios have different requirements for data rates, latency, reliability, coverage, and the like. Accordingly, as a method for efficiently satisfying the requirements of the individual usage scenarios through a frequency range configuring an NR system, it is necessary to develop a method for efficiently multiplexing radio resource units based on mutually-different numerologies (for example, subcarrier spacing, a subframe, a Transmission Time Interval (TTI), and the like).

As a part of such an aspect, in the case of transmitting a plurality of uplink control information in one slot in NR, there is required a design for configuring repeated transmission of predetermined uplink control information or transmission of uplink data channel in the same slot.

DETAILED DESCRIPTION OF THE INVENTION

Technical Problem

According to embodiments of the present disclosure, methods and apparatuses are provided for improving reliability and performing efficient transmission of uplink control channels by multiplexing and transmitting a plurality of uplink control information to one PUCCH resource in a case in which repeated transmission of uplink control information is configured in one slot.

According to embodiments of the present disclosure, methods and apparatuses are provided for improving reliability and performing efficient transmission of uplink control channels by multiplexing and transmitting a plurality of uplink control information to one PUSCH resource when transmission of PUSCH is indicated in a case in which repeated transmission of uplink control information is configured in one slot.

Technical Solution

According to one aspect, a method may be provided for transmitting uplink control information (UCI) using a user equipment (hereinafter, referred as "UE"). The method may include receiving configuration information on a plurality of physical uplink control channel (PUCCH) resources allocated to transmission of the plurality of UCIs in one slot, determining one PUCCH resource among the plurality of PUCCH resources based on a priority level of each of the plurality of UCIs, and multiplexing and transmitting the plurality of UCIs to the one PUCCH resource.

According to another aspect, a method may be provided for receiving uplink control information (UCI) using a base station. The method may include transmitting configuration information on a plurality of physical uplink control channel (PUCCH) resources allocated to transmission of the plurality of UCIs in one slot, transmitting configuration information on repeated transmission for at least one of the UCIs, and receiving the UCIs multiplexed to one PUCCH resource. The one PUCCH resource may be determined among the plurality of PUCCH resources based on and a priority level of each of the plurality of UCIs from the configuration information on the repeated transmission.

In addition, according to another aspect, a UE may be provided for transmitting uplink control information (UCI). The UE may include a receiver configured to receive configuration information on a plurality of physical uplink control channel (PUCCH) resources allocated to transmission of the plurality of UCIs in one slot, a controller configured to determine one PUCCH resource among the plurality of PUCCH resources based on a priority level of each of the plurality of UCIs, and a transmitter configured to multiplex and transmit the plurality of UCIs to the one PUCCH resource.

In addition, according to another aspect, a base station may be provided for receiving uplink control information (UCI). The base station may include a transmitter configured to transmit configuration information on a plurality of physical uplink control channel (PUCCH) resources allocated to transmission of the plurality of UCIs in one slot and configuration information on repeated transmission for at least one of the UCIs, and a receiver configured to the UCIs multiplexed to one PUCCH resource. The one PUCCH resource may be determined among the plurality of PUCCH resources based on and a priority level of each of the plurality of UCIs from the configuration information on the repeated transmission.

Advantageous Effects

The methods and apparatus according to the embodiments of the present disclosure may improve reliability and perform efficient transmission of uplink control channels by multiplexing and transmitting a plurality of uplink control information to one PUCCH resource in a case in which repeated transmission of uplink control information is configured in one slot.

The methods and apparatus according to the embodiments of the present disclosure may improve reliability and perform efficient transmission of uplink control channels by multiplexing and transmitting a plurality of uplink control information to one PUSCH resource when transmission of PUSCH is indicated in a case in which repeated transmission of uplink control information is configured in one slot.

MODE FOR CARRYING OUT THE INVENTION

Figure 1:
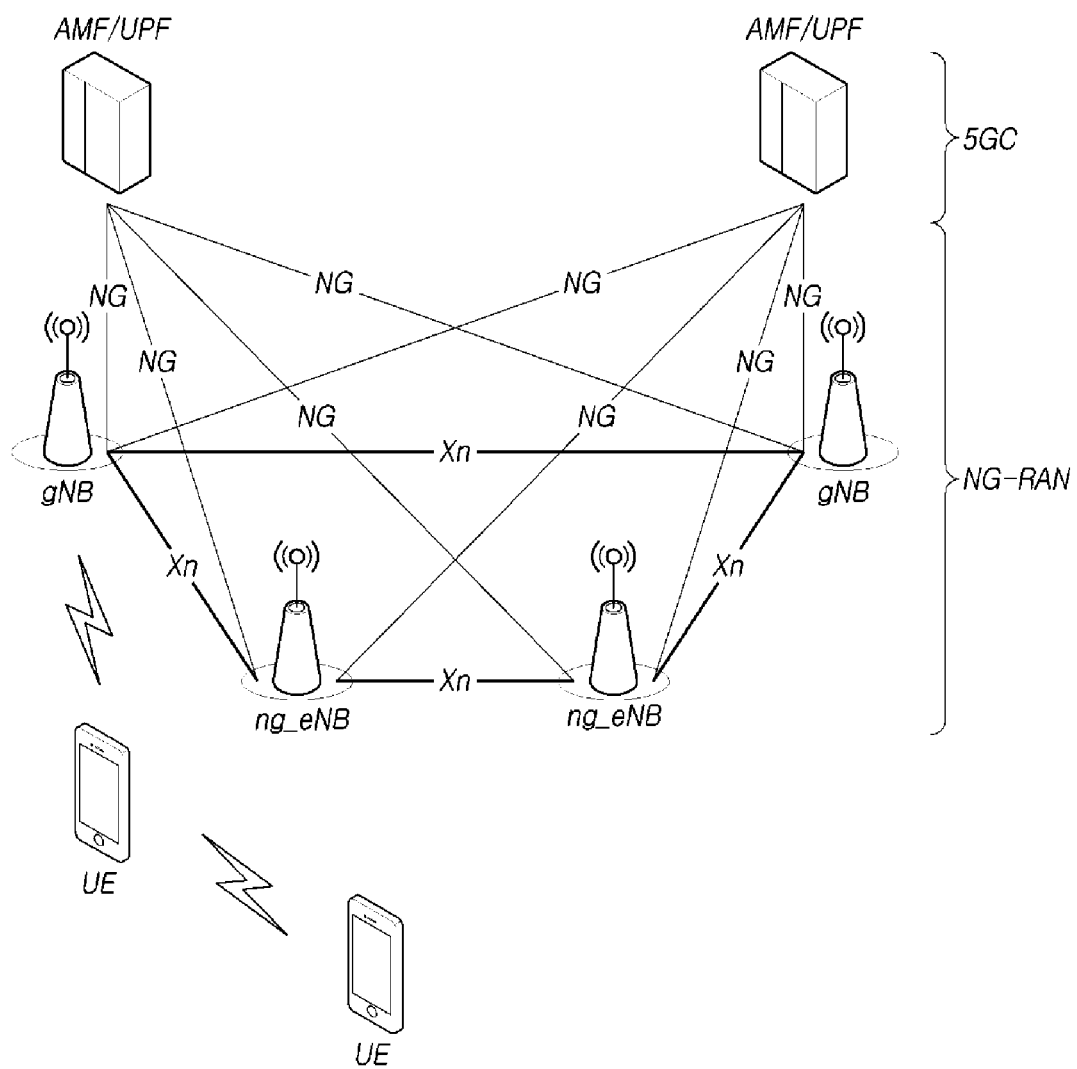
FIG. 1 is a diagram schematically illustrating a structure of an NR radio communication system.

Hereinafter, some embodiments of the present disclosure will be described in detail with reference to the exemplary drawings. In assigning reference signs to constituent elements of the drawings, the same reference numerals may be assigned to the same constituent elements as possibly although they are illustrated in different drawings. In describing these embodiments, in a case in which it is determined that specific description of a related known configuration or function may make the concept of the present technical idea unclear, detailed description thereof may be omitted. In a case in which "comprises", "includes", "has", "is formed" and the like mentioned in here are used, other parts may be added unless "only" is used. In a case in which a constituent element is represented in a singular form, it may include a case in which a plurality thereof are included unless otherwise mentioned explicitly.

In describing constituent elements of the present disclosure, terms such as "first", "second", "A", "B", "(a)", "(b)", and the like may be used. Such terms are only for identifying a specific constituent element from the other constituent elements, and the essence, the sequences, the order, the numbers, and the like of the constituent elements are not limited by the terms.

In description of a positional relation between constituent elements, in a case in which two or more constituent elements are described as being "linked", "combined", "connected", or the like, it should be understood that the two or more constituent elements may be "linked", "combined", or "connected" with another constituent element other than the two or more constituent elements being "interposed" therebetween although they may be directly "linked", "combined", or "connected". Here, the another constituent element may be included in one or more of the two or more constituent elements that are "linked", "combined", or "connected"

In description of a temporal flow relation relating to constituent elements, an operating method, a manufacturing method, and the like, in a case in which an order relation in time or an order relation in a flow is described, for example, using "after", "thereafter", "next", "before", or the like, a non-continuous case may be included therein unless "immediately" or "directly" is used.

In a case in which a numerical value of a constituent element or information corresponding thereto (for example, a level or the like) is mentioned, the numerical value or the information corresponding thereto may be interpreted to include an error range that may occur due to various factors (for example, a factor in the process, an internal or external shock, a noise, and the like) even when there is no additional explicit description.

A radio communication system described here represents a system used for providing various communication services such as a voice service, a data packet service, and the like using radio resources. Such a radio communication system may include a UE and a base station or a core network.

These embodiments to be described below may be applied to a radio communication system using various radio connection technologies. For example, these embodiments may be applied to various radio connection technologies such as a code division multiple access (CDMA), a frequency division multiple access (FDMA), a time division multiple access (TDMA), an orthogonal frequency division multiple access (OFDMA), a single carrier frequency division multiple access (SC-FDMA), a non-orthogonal multiple access (NOMA), and the like. In addition, a radio connection technology may represent not only a specific connection technology but also a communication technology of each generation established by various communication consultative organizations such as 3GPP, 3GPP2, WiFi, Bluetooth, IEEE, ITU, and the like. For example, the CDMA may be realized using a radio technology such as a universal terrestrial radio access (UTRA) or CDMA2000. The TDMA may be realized using a radio technology such as global system for mobile communications (GSM)/general packet radio service (GPRS)/enhanced data rates for GSM evolution (EDGE). The OFDMA may be realized using a radio technology such as institute of electrical and electronics engineers (IEEE) 802.11 (Wi-Fi), IEEE 802.16 (WiMAX), IEEE 802-20, evolved UTRA (evolved UTRA), or the like. IEEE 802.16m is an evolved IEEE 802.16e and provides backward compatibility with a system based on IEEE 802.16e. The UTRA is a part of a universal mobile telecommunications system (UMTS). 3rd generation partnership project (3GPP) long term evolution (LTE) is a part of evolved UMTS (E-UMTS) using an evolved-UMTS terrestrial radio access (E-UTRA) and employs an OFDMA in a downlink and employs an SC-FDMA in an uplink. In this way, these embodiments may be applied to a radio connection technology that is currently disclosed or available in the market or a radio connection technology that is currently under development or will be developed in the future.

Meanwhile, a UE described here has a comprehensive concept representing a device including a radio communication module for communicating with a base station in a radio communication system and should be interpreted to have a concept including not only a user equipment (UE) in WCDMA, LTE, NR, HSPA, and IMT-2020 (5G or new radio) and the like but also a mobile station (MS), a user terminal (UT), a subscriber station (SS), a wireless device, and the like in GSM. In addition, depending on the usage form, a UE may be a user portable device such as a smartphone and may represent a vehicle in a V2X communication system, a device including a radio communication module inside a vehicle, or the like. Furthermore, in the case of a machine-type communication (MTC) system, a UE may represent an MTC terminal, an M2M terminal, an URLLC terminal, or the like having a communication module mounted therein such that machine type communication is performed.

A base station or a cell described here represents an end that communicates with a UE from the viewpoint of a network and comprehensively includes all the various coverage areas such as Node-B, evolved Node-B (eNB), gNode-B (gNB), a Low Power Node (LPN), a sector, a site, antennas having various forms, a base transceiver system (BTS), an access point, a point (for example, a transmission point, a reception point, or a transmission/reception point), a relay node, a mega-cell, a macro-cell, a micro-cell, a pico-cell, a femto cell, a remote radio head (RRH), a radio unit (RU), a small cell, and the like. In addition, a cell may have a meaning including a bandwidth pat (BWP) in a frequency domain. For example, a serving cell may represent an activation BWP of a UE.

Regarding the various cells listed above, a base station may control one or more cells. Accordingly, the base station may be interpreted as two meanings, 1) a device that provides a mega-cell, a macro-cell, a micro-cell, a pico-cell, a femto cell, and a small cell in relation with a radio area or 2) the radio area itself. In 1), the base station may be devices which provide predetermined radio areas and controlled by the same object or the base station may be all the devices interacting with each other to configure a radio area in cooperation. For example, the base station may include a point, a transmission/reception point, a transmission point, a reception point, and the like according to configuration types of radio areas. In 2), the base station may be a radio area in which a UE receives or transmit signals from or to another UE or adjacent base stations.

A cell may represent a coverage of signals transmitted from a transmission/reception point, a component carrier having a coverage of signals transmitted from a transmission/reception point (a transmission point or a transmission/reception point), or the transmission/reception point.

An uplink (UL) represents a channel (e.g., link) from a UE to a base station for data transmission/reception from the UE to the base station. A downlink (DL) represents a communication channel (e.g., communication link) from a base station to a UE for data transmission/reception from the base station to the UE. The downlink may represent communication (e.g., communication path) at a multiplexing transmission/reception point toward a UE. The uplink may represent communication (e.g., communication path) at a UE toward a multiplexing transmission/reception point. In the downlink, a transmitter may be a part of the multiplexing transmission/reception point, and a receiver may be a part of the UE. In addition, in the uplink, a transmitter may be a part of the UE, and a receiver may be a part of the multiplexing transmission/reception point.

The uplink and downlink transmit and receive control information through control channels such as a Physical Downlink Control Channel (PDCCH) and a Physical Uplink Control Channel (PUCCH). The uplink and downlink transmit and receive data by configuring data channels such as a Physical Downlink Shared Channel (PDSCH) and a Physical Uplink Shared Channel (PUSCH).

Hereinafter, a situation in which signals are transmitted and received through channels such as the PUCCH, the PUSCH, the PDCCH, and the PDSCH may be described as "transmitting and receiving the PUCCH, the PUSCH, the PDCCH, and the PDSCH.

In order to clarify description, hereinafter, the present technical idea will be described mainly with reference to a 3GPP LTE/LTE-A/New RAT(NR) communication system. However, the present technical aspects are not limited to the communication system.

3GPP introduces and develops 5th-generation (5G) communication technologies for satisfying requirements of the next-generation radio connection technology of ITU-R after 4th-generation (4G) communication technologies. More specifically, as 5G communication technologies, 3GPP develops i) LTE-A pro by improving an LTE-Advanced technology in accordance with requirements of ITU-R and ii) a new NR communication technology that is separate from the 4G communication technology. Both the LTE-A pro and NR represent 5G communication technologies. Hereinafter, the 5G communication technology will be described mainly with reference to NR. As operating scenarios in NR, various operating scenarios have been defined by adding considerations of satellites, vehicles, a new vertical, and the like to scenarios of typical 4G LTE, and an Enhanced Mobile Broadband (eMBB), a Massive Machine Communication (mMTC) having a high UE density, expanding in a broad range, and requiring a low date rate and an asynchronous connection, and a Ultra Reliability and Low Latency (URLLC) scenario requiring high responsiveness and reliability and capable of supporting high-speed mobility are supported from the viewpoint of services.

In order to satisfy such scenarios, NR introduces a radio communication system supporting new waveform and frame structure technologies, a low latency technology, an ultra-high frequency range (mmWave) supporting technology, and a forward compatibility providing technology. Particularly, an NR system includes various technical changes, as compared to typical communication system, from the viewpoint of flexibility for providing forward compatibility. Major technical features of NR will be described below with reference to the drawings.

<NR System>

FIG. 1 is a diagram schematically illustrating a structure of an NR system.

Referring to FIG. 1, the NR system is divided into a 5G Core Network (5GC) and an NR-RAN part. NG-RAN includes i) gNBs and ng-eNBs providing user planes (SDAP/PDCP/RLC/MAC/PHY) and ii) a control plane (RRC) protocol end for a user equipment (UE). One gNB is connected to another gNB or an ng-eNB through an Xn interface. The gNBs and the ng-eNBs are connected to 5GC through NG interfaces. 5GC may be configured to include an Access and Mobility Management Function (AMF) responsible for control planes of a UE connection and mobility control function and the like and a User Plane Function (UPF) responsible for a user data control function. NR includes supports for both a frequency range of 6 GHz or less (frequency range 1 (FR1)) and a frequency range of 6 GHz or more (frequency range 2 (FR2)).

The gNB is represents a base station providing an NR user plan and a control plane protocol end for UEs, and the ng-eNB represents a base station providing an E-UTRA user plane and a control plane protocol end for UEs. A base station described here should be understood to have a meaning including the gNB and the ng-eNB and may be used to have a meaning that separately indicates the gNB or the ng-eNB as is necessary.

<NR Waveform, Numerology, and Frame Structure>

In NR, a CP-OFDM waveform using a cyclic prefix is used for downlink transmission, and a CP-OFDM or a DFT-s-OFDM is used for uplink transmission. An OFDM technology may be easily combined with Multiple Input Multiple Output (MIMO) and has an advantage of being able to use a receiver having a low degree of complexity together with high frequency efficiency.

Since requirements for a data rate, latency, coverage, and the like are different for each of the three scenarios described above in NR, it is necessary to efficiently satisfy requirements for each scenario through a frequency range configuring an NR system. For this, a technology for efficiently multiplexing radio resources based on a plurality of mutually-different numerologies has been introduced.

More specifically, an NR transmission numerology is determined on the basis of sub-carrier spacing and a cyclic prefix (CP), and, as illustrated in Table 1 below, a $\mu$ value is used as an exponential value of "2" using 15 kHz as a reference and is changed exponentially.

TABLE 1

| $\mu$ | Subcarrier interval | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
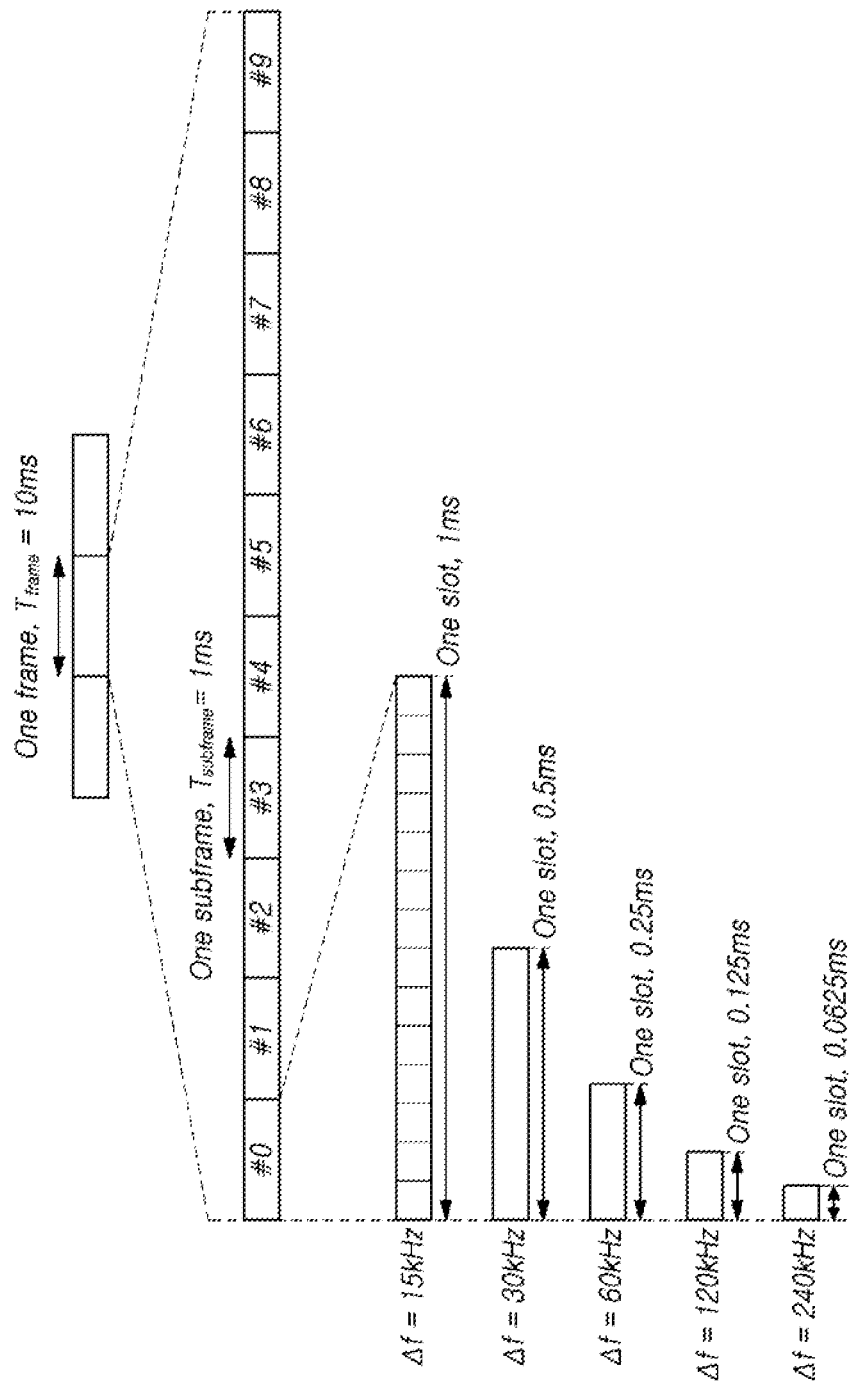
FIG. 2 is a diagram illustrating a frame structure in an NR system.

As in Table 1 presented above, the numerology of NR may be classified into five types in accordance with sub-carrier spacing. This is different from LTE, which is one of 4G communication technologies, of which sub-carrier spacing is fixed to 15 kHz. More specifically, in NR, sub-carrier spacings used for data transmission are 15, 30, 60, and 120 kHz, and sub-carrier spacings used for transmission of a synchronous signal are 15, 30, 120, and 240 kHz. In addition, an extended CP is applied only to the sub-carrier spacing of 60 kHz. As a frame structure in NR, a frame having a length of 10 ms configured by 10 subframes having the same length of 1 ms is defined. One frame may be divided into half frames having a length of 5 ms, and each half frame includes five subframes. In the case of a subcarrier spacing of 15 kHz, one subframe is configured by one slot, and each slot is configured by 14 OFDM symbols. FIG. 2 is a diagram illustrating a frame structure in an NR system. Referring to FIG. 2, a slot is made up of 14 OFDM symbols in the case of a normal CP, and a length of a slot in the time domain may be different in accordance with a subcarrier spacing. For example, in the case of a numerology having a subcarrier spacing of 15 kHz, a slot has a length of 1 ms and is configured to have the same length as a subframe. Differently from this, in the case of a numerology having a subcarrier spacing of 30 kHz, a slot is made up of 14 OFDM symbols, and two slots may be included in one subframe with a length of 0.5 ms. In other words, a subframe and a frame are defined to have fixed time lengths, a slot is defined using the number of symbols and may have different time lengths in accordance with subcarrier spacings.

In NR, the basic unit of scheduling is defined as a slot, and mini-slots (or sub-slots or non-slot based schedules) are introduced for decreasing latency of a radio section. When a wide subcarrier spacing is used, the length of one slot is shortened in inverse proportion thereto. Accordingly, latency in a radio section may be decreased. A mini slot (or a subslot) is used for efficient support for the URLLC scenario and may be scheduled in units of 2, 4, and 7 symbols.

In NR different from LTE, allocation of uplink and downlink resources is defined by symbol levels within one slot. In order to decrease an HARQ delay, a slot structure is defined to immediately transmit HARQ ACK/NACK within a transmission slot, and such a slot structure will be described as a self-contained structure.

NR is designed to be able to support a total number of 256 slot formats, and 62 slot formats among these are used in 3GPP Rel-15. In addition, a common frame structure configuring an FDD or TDD frame through a combination of various slots is supported. For example, NR supports a slot structure in which all the symbols of a slot are set to downlinks, a slot structure in which all the symbols are set to uplinks, and a slot structure in which downlink symbols and uplink symbols are combined. In addition, NR supports data transmission being scheduled to be distributed to one or more slots. Accordingly, a base station may inform a UE whether a slot is a downlink slot, an uplink slot, or a flexible slot using a slot format indicator (SFI). A base station may direct a slot format by directing an index of a table configured through UE-specific RRC signaling using an SFI and also give a direction dynamically using downlink control information (DCI) or give a direction statically or quasi-statically through an RRC.

<NR Physical Resource>

In NR, an antenna port, a resource grid, a resource element, a resource block, a bandwidth part, and the like are considered as physical resources.

The antenna port is defined to infer a channel conveying symbols on an antenna port from another channel conveying the other symbols on the same antenna port. In a case of inferring a large-scale property of a channel for conveying symbols on one antenna port from another channel conveying symbols on another antenna port, it may be regarded that the two antenna ports are in a quasi co-located or quasi co-location (QC/QCL) relation. Here, the large-scale property includes one or more of delay spread, Doppler spread, frequency shift, average received power, and received timing.

Figure 3:
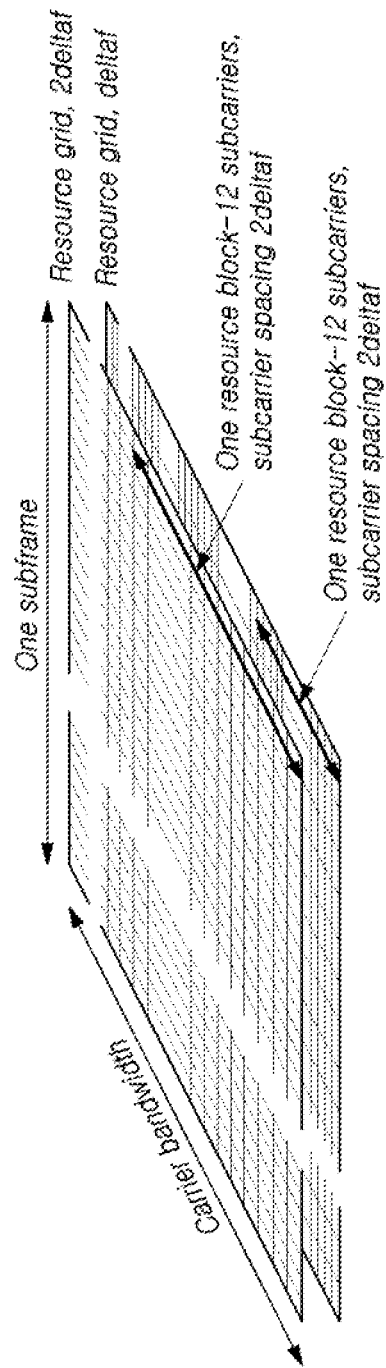
FIG. 3 is a diagram illustrating resource grids supported by a radio connection technology.

FIG. 3 is a diagram illustrating resource grids supported by a radio connection technology.

Referring to FIG. 3, as the resource grids, since NR supports a plurality of numerologies in the same carrier, a resource grid may be present in accordance with each numerology. In addition, a resource grid may be present in accordance with an antenna port, a subcarrier spacing, and a transmission direction.

A resource block is configured by 12 subcarriers and is defined only on the frequency domain. In addition, a resource element is configured by one OFDM symbol and one subcarrier. Accordingly, as illustrated in FIG. 3, a size of one resource block may be different in accordance with a subcarrier spacing. In addition, in NR defines "Point A"

performing the role of a common reference point for the resource block grid, a common resource block, a virtual resource block, and the like.

Figure 4:
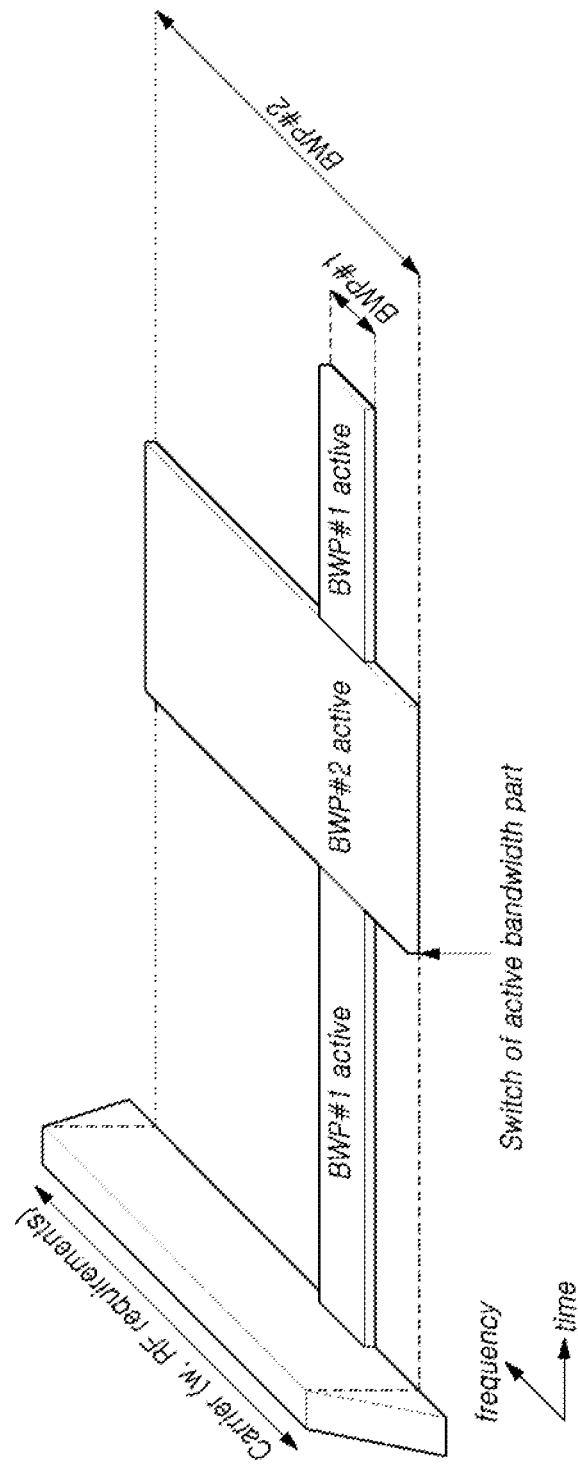
FIG. 4 is a diagram illustrating a bandwidth part supported by a radio connection technology.

FIG. 4 is a diagram illustrating a bandwidth part supported by a radio connection technology.

Different from LTE in which a carrier bandwidth is fixed to 20 Mhz, a maximum carrier bandwidth is set to 50 Mhz to 400 Mhz for each subcarrier spacing in NR. Accordingly, it is not assumed that all the UEs use all such carrier bandwidths. In accordance with this, in NR, as illustrated in FIG. 4, a bandwidth part (BWP) may be designated and used by a UE within the carrier bandwidth. The bandwidth part is linked with one numerology, is configured by a subset of continuous common resource blocks, and may be dynamically activated in accordance with a time. In a UE, a maximum of four bandwidth parts are configured for each of the uplink and the downlink, and data is transmitted and received using a bandwidth part that is activated at a given time.

In the case of a paired spectrum, uplink and downlink bandwidth parts are independently set. In the case of an unpaired spectrum, in order to prevent unnecessary frequency re-tuning between downlink and uplink operations, bandwidth parts of the uplink and the downlink are set as a pair such that a center frequency can be shared.

<NR Initial Connection>

In NR, a UE performs a cell search and a random access process for being connected to a base station and performing communication.

The cell search is a process of a UE for i) being synchronized with a cell of a base station using a synchronization signal block (SSB) transmitted by the base station, ii) acquiring a physical layer cell ID, and iii) acquiring system information.

Figure 5:
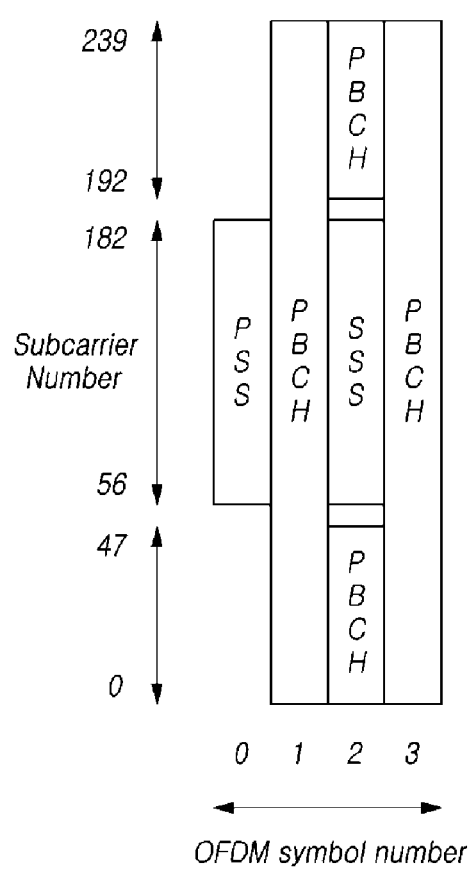
FIG. 5 is a diagram illustrating a synchronization signal block in a radio connection technology.

FIG. 5 is a diagram illustrating a synchronization signal block in a radio connection technology.

Referring to FIG. 5, an SSB includes a primary synchronization signal (PSS) and a secondary synchronization signal (SSS) each occupying one symbol and 127 subcarriers and a PBCH extending over three OFDM symbols and 240 subcarriers.

A UE receives an SSB by monitoring the SSB in the time and frequency domains.

The SSB may be transmitted maximum 64 times for 5 ms. Multiple SSBs are transmitted in mutually-different transmission beams within a time interval of 5 ms, and the UE performs detection by assuming that an SSB is transmitted for every period of 20 ms when one specific beam used for transmission is viewed as a reference. The number of beams used for transmission of SSBs within a time interval of 5 ms may be increased as the frequency range becomes higher. For example, maximum four SSB beams may be transmitted in a frequency range equal to or lower than 3 GHz, and SSBs may be transmitted using maximum 8 beams in a frequency range of 3 to 6 GHz and maximum 64 mutually-different beams for a frequency range equal to or higher than 6 GHz.

Two SSBs are included in one slot. A start symbol and the number of times of repetition within a slot are determined as below in accordance with a subcarrier spacing.

Differently from SS of typical LTE, no SSB is transmitted at the center frequency of a carrier bandwidth. In other words, an SSB may be transmitted at a frequency other than the center of the system band range, and a plurality of SSBs may be transmitted on the frequency domain in a case in which a broadband operation is supported. In accordance with this, the UE monitors an SSB using a synchronization raster that is a candidate frequency position for monitoring SSBs. NR newly defines a carrier raster that is center frequency position information of a channel for initial connection and a synchronization raster, and the synchronization raster has a frequency interval set wider than that of the carrier raster and thus can support a UE's quick SSB search.

The UE may acquire an MIB through the PBCH of the SSB. A master information block (MIB) includes minimum information for the UE to receive the remaining minimum system information (RMSI) that is broadcasted by a network. In addition, the PBCH may include information of a position of the first DM-RS symbol on the time domain, information used for the UE to perform monitoring SIB1 (for example, SIB1 numerology information, information relating to an SIB1 CORESET, search space information, parameter information relating to a PDCCH, and the like), offset information between a common resource block and an SSB (a position of an absolute SSB within a carrier is transmitted through the SIB1), and the like. Here, the SIB1 numerology information is similarly applied also to messages used in the random access process for a connection to the base station after the UE has completed a cell search process. For example, the numerology information of the SIB1 may be applied to at least one of messages 1 to 4 for the random access process.

The RMSI may represent a system information block 1 (SIB1), and the SIB1 is broadcasted periodically (for example, 160 ms) by a cell. The SIB1 includes information required for the UE to perform an initial random access process and is periodically transmitted through the PDSCH. In order for the UE to receive the SIB1, numerology information used for transmitting the SIB1 through the PBCH and control resource set (CORESET) information used for scheduling the SIB1 need to be received. The UE checks scheduling information for the SIB1 using SI-RNTI inside the CORESET and acquires the SIB1 on the PDSCH on the basis of the scheduling information. The remaining SIBs other than the SIB1 may be periodically transmitted or may be transmitted in response to a request from the UE.

Figure 6:
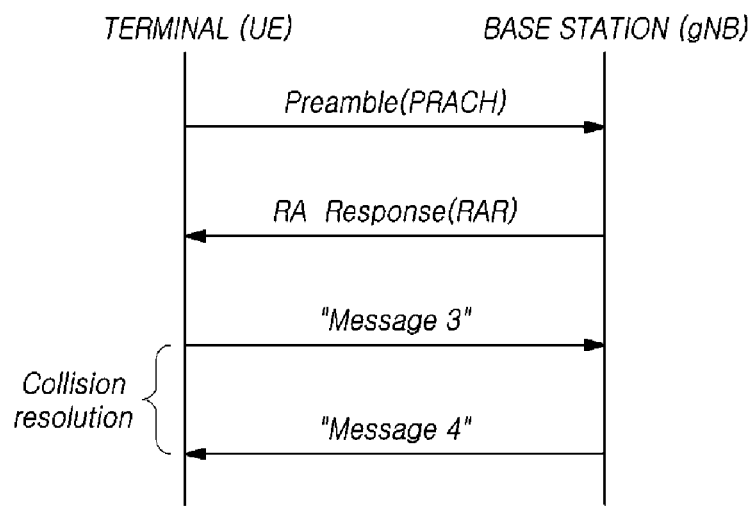
FIG. 6 is a diagram illustrating a random access process in a radio connection technology.

FIG. 6 is a diagram illustrating a random access process in a radio connection technology.

Referring to FIG. 6, when a cell search is completed, a UE transmits a random access preamble used for a random access to a base station. The random access preamble is transmitted through a PRACH. More specifically, the random access preamble is transmitted to the base station through a PRACH configured by radio resources that are continuous in a specific slot that is periodically repeated. Generally, a contention-based random access process is performed when a UE initially connects to a cell, and a non-contention based random access process is performed when a random access is performed for beam failure recovery (BFR).

The UE receives a random access response for the transmitted random access preamble. The random access response may include a random access preamble identifier (ID), a UL grant (uplink radio resource), a temporary cell-radio network temporary identifier (C-RNTI), and a time alignment command (TAC). Since random access response information for one or more UEs may be included in one random access response, the random access preamble identifier may be included for giving a notification of a UE for which the RL grant, the temporary C-RNTI, and the TAC that are included are valid. The random access preamble identifier may be an identifier for a random access preamble received by the base station. The TAC may be included as information used for the UE to adjust uplink synchronization. The random access response may be directed using a random access identifier on the PDDCCH, in other words, a random access-radio network temporary identifier (RA-RNTI).

The UE that has received valid random access response processes information included in the random access response and performs scheduled transmission for the base station. For example, the UE applies the TAC and stores the temporary C-RNTI. In addition, the UE transmits data stored in a buffer of the UE or newly-generated data to the base station using the UL grant. In this case, it is necessary to include information for identifying the UE.

Finally, the UE receives a downlink message for contention resolution.

<NR CORESET>

A downlink control channel in NR is transmitted in a control resource set (CORESET) having a length of 1 to 3 symbols and transmits uplink/downlink scheduling information, a slot format index (SFI), transmit power control (TPC) information, and the like.

In this way, in order to secure flexibility of the system, the concept of NR introduces the CORESET. The control resource set (CORESET) represents a time-frequency resource for a downlink control signal. A UE may decode a control channel candidate using one or more search spaces in CORESET time-frequency resources. A quasi colocation (QCL) assumption is set for each CORESET, and this is used for the purpose of giving a notification of an analog beam direction in addition to delay spread, Doppler spread, a Doppler shift, and an average delay that are properties assumed by a typical QCL.

Figure 7:
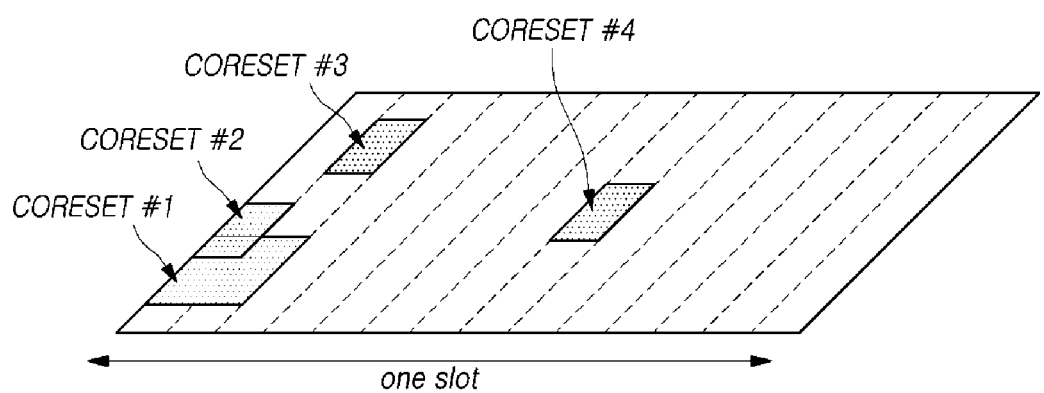
FIG. 7 is a diagram illustrating a CORESET.

FIG. 7 is a diagram illustrating CORESETs.

Referring to FIG. 7, CORESETs may be present in various forms within a carrier bandwidth within one slot, and the CORESET may be configured by maximum three OFDM symbols on the time domain. In addition, the CORE-SET is defined as a multiple of six resource blocks up to the carrier bandwidth on the frequency domain.

A first CORESET is directed through an MIB in a part of the initial bandwidth part configuration such that additional configuration information, and system information may be received from a network. After setting a connection to the base station, the UE may configure a CORESET by receiving one or more pieces of CORESET information through RRC signaling.

In description presented here, a frequency, a frame, a subframe, resources, a resource block, a region, a band, a sub-band, a control channel, a data channel, a synchronization signal, various reference signals, various signals or various messages relating to new radio (NR) may be interpreted to have meanings that were used in the past or are currently used or various meanings that will be used in the future.

New Radio (NR)

NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of NR. In order to meet requirements for each usage scenario, it is required to design NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, NR defines a subframe as one type of a time domain structure. In addition, as a reference numerology to define a corresponding subframe duration, a single subframe duration is defined as having 14 OFDM symbols of normal CP overhead based on 15 kHz subcarrier spacing (SCS), like LTE. Therefore, the subframe of NR has the time duration of 1 ms. Unlike LTE, since the subframe of NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
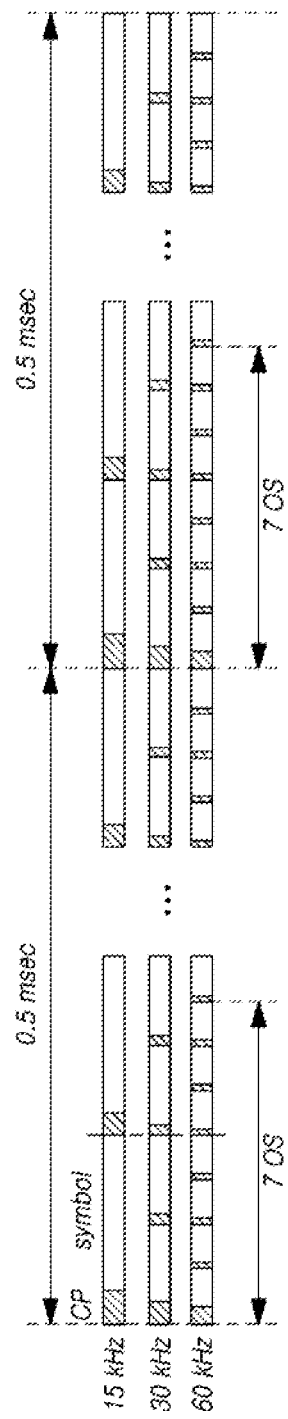
FIG. 8 is a diagram illustrating an example of symbol level alignment among different SCS's.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

Wider Bandwidth Operations

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
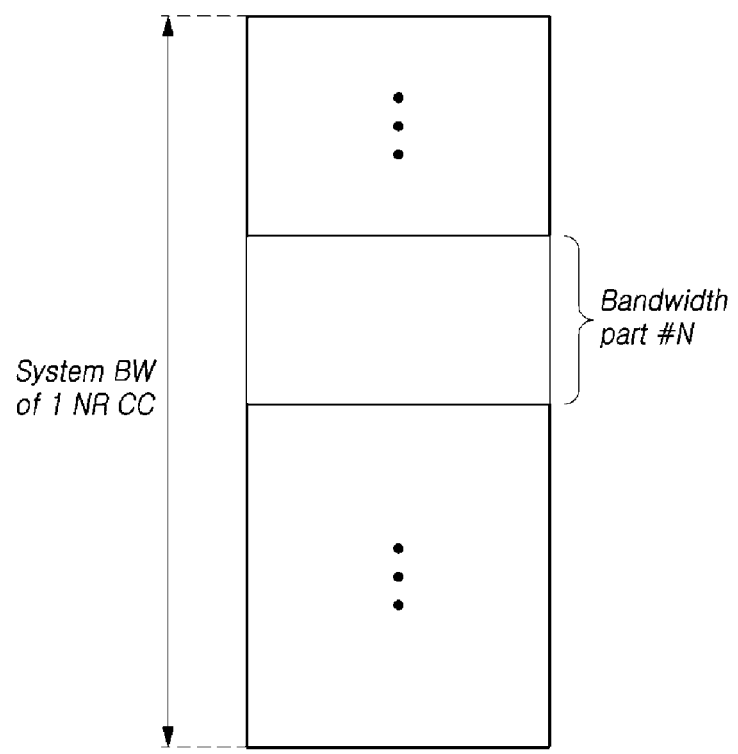
FIG. 9 is a diagram illustrating a conceptual example of a bandwidth part.

However, NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

Method of Allocating a HAM) ACK/NACK Feedback Resource

According to a PUCCH resource allocating method for an HARQ ACK/NACK feedback of a UE defined in NR, a base station configures a PUCCH resource set with one or more PUCCH resources for a UE, and PUCCH resource information to be used for an HARQ ACK/NACK feedback for PDSCH transmission is defined to be directed through an ACK resource indicator (ARI) information region of the DCI. Here, the PUCCH resource set is configured for each UL BWP for the UE, and additional PUCCH resource sets are defined to be configured in accordance with a payload size of the HARQ ACK/NACK for an UL BWP.

UCI Piggyback on PUSCH

When PUCCH resource allocation for UCI transmission including HARQ ACK/NACK feedback information or CSI feedback information and PUSCH resource allocation for UL-SCH transmission are overlapped through one slot, the UE may piggyback the UCI on the corresponding PUSCH to transmit.

Hereinafter, a method of transmitting/receiving uplink control information will be described in more detail with reference to relating drawings.

Figure 10:
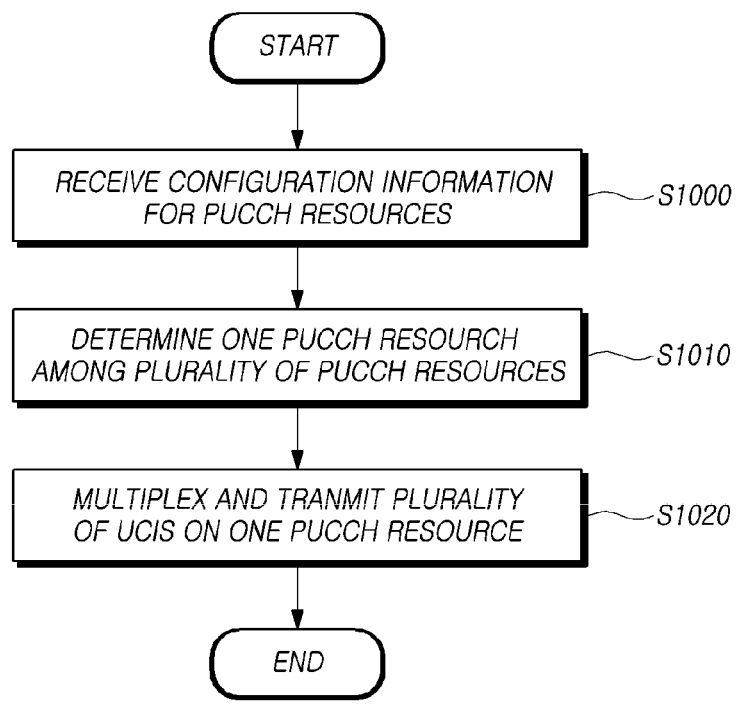
FIG. 10 is a flowchart illustrating a method of a UE for transmitting uplink control information according to one embodiment.

FIG. 10 is a flowchart illustrating a process of a UE for transmitting uplink control information according to one embodiment.

Referring to FIG. 10, a UE may receive configuration information on a plurality of physical uplink control channel (PUCCH) resources allocated to transmission of the plurality of UCIs in one slot at S1000.

The PUCCH resources may be configured to be used for transmitting the UCI for the UE. For example, in order to respectively transmit HARQ ACK/NACK feedback information for a plurality of PDSCHs received from the base station, the plurality of PUCCH resources may be configured in one slot for the UE, respectively.

According to an embodiment, the PUCCH resources for intra-slot PUCCH repetition may be additionally configured. For example, the base station may configure subslot-based PUCCH resources for additionally applying the intra-slot PUCCH repetition in addition to the existing slot-based PUCCH resources for the UE through higher layer signaling.

The UE may receive configuration information for slot-based PUCCH resources and configuration information for subslot-based PUCCH resources from the base station, respectively.

In this case, the configuration information for the subslot-based PUCCH resources may additionally include information on the number of repetitions for UCI transmission in addition to the PUCCH resource configuration information configuring the slot-based PUCCH resource set.

According to an embodiment, when the UCI includes HARQ feedback information, the slot-based PUCCH resource set and the subslot-based PUCCH resource set may be configured based on different HARQ-ACK codebooks. That is, in order to support different service types of the UE, at least two HARQ-ACK codebooks may be simultaneously configured. In this case, parameters in the PUCCH configuration related to HARQ-ACK feedback for different HARQ-ACK codebooks may be configured to be distinguished from each other. Identification of the HARQ-ACK codebook may be distinguished by the DCI format, the Radio Network Temporary Identifier (RNTI) of the UE, an explicit indication in the DCI, or the core set/search space.

Referring back to FIG. 10, the UE may determine one PUCCH resource among the plurality of PUCCH resources based on a priority level of each of the plurality of UCIs at S1010.

According to an embodiment, when the UE performs the HARQ ACK/NACK feedback for PDSCH reception, whether to apply intra-slot PUCCH repetition for reliability improvement may be explicitly or implicitly signaled by the base station.

The UE may receive indication information on the intra-slot PUCCH repetition as information indicating the subslot-based PUCCH resources from the base station through explicit higher layer signaling. Alternatively, the UE may receive indication information on the intra-slot PUCCH repetition as information indicating the subslot-based PUCCH resources from the base station through a DCI format for transmitting PDSCH resource allocation information.

Alternatively, the information indicating the subslot-based uplink control channel resource set may be configured based on a downlink control channel search space or a UE RNTI (Radio Network Temporary Identifier) to be implicitly indicated. That is, the UE may receive information on the CORESET or the search space or the UE RNTI as information indicating the subslot-based uplink control channel resource set.

Alternatively, if the RNTI applied to CRC scrambling of the DCI format including resource allocation information for PDSCH is MCS-C-RNTI, it will be configured that the intra-slot PUCCH repetition is applied, and otherwise, the intra-slot PUCCH repetition is not applied. Alternatively, by allocating a separate new RNTI for applying the intra-slot PUCCH repetition, allocation information on PDSCH transmission resources requiring intra-slot PUCCH repetition application may be configured to be implicitly transmitted by performing the CRC scrambling based on the new RNTI.

That is, in the case where each PUCCH resource for transmission of the plurality of UCIs is allocated through one slot, when repeated transmission of some UCI is indicated, the UE may determine one PUCCH resource for multiplexing the plurality of UCIs among the plurality of PUCCH resources. In this case, the priority level of each of the plurality of UCIs for determining one PUCCH resource may be determined based on at least one of whether the PUCCH resource allocated for UCI transmission is configured for repeated transmission or the number of repeated transmissions according to an embodiment.

According to an embodiment, the priority level for UCI multiplexing may be determined according to whether the intra-slot PUCCH repetition for arbitrary UCI transmission is configured or indicated. That is, when UCI transmission to which the intra-slot PUCCH repetition is applied is configured, and PUCCH resources for the UCI multiplexing are determined, PUCCH resources to which the intra-slot PUCCH repetition is applied may have higher priority than PUCCH resources to which intra-slot PUCCH repetition is not applied.

In this case, when the intra-slot PUCCH repetition is configured for one or more UCIs, priorities may be additionally distinguished according to the number of repetitions. If two or more UCI transmissions having the same priority are indicated, that is, if repeated transmission is applied and the number of repetitions is the same, the method of determining PUCCH resources based on the serving cell index and PDCCH monitoring occasion index may be applied.

By applying such a criterion, one PUCCH resource with the highest priority may be determined as a PUCCH resource for multiplexing the UCI.

On the contrary, it may be configured to have a higher priority for a PUCCH resource to which repeated transmission is not applied. Even in this case, when repeated transmission is applied to all UCIs, the priority may be determined according to the number of repetitions. In addition, when there are two or more PUCCH resources of the same priority, the PUCCH resources may be determined based on the above-described serving cell index and PDCCH monitoring occasion index according to the above-described method.

In this way, when a PUCCH resource to which the repeated transmission is not applied and a PUCCH resource having a small number of repetitions are configured to have higher priority, the UCI codebook size for multiplexing and transmitting the UCI through the determined PUCCH resource may be determined as follows. That is, in the case of the UCI in which the repeated transmission is configured in one slot, the actual HARQ-ACK codebook size is multiplied by the number of repetitions so that the HARQ-ACK codebook size when UCI multiplexing is applied may be determined.

Referring back to FIG. 10, the UE may multiplex and transmit the plurality of UCIs on one PUCCH resource at S1020.

The UE may multiplex the plurality of UCIs to one PUCCH resource having the highest priority according to the above-described condition among the plurality of PUCCH resources allocated to a plurality of UCI transmissions. The UE may transmit the PUCCH multiplexed with the plurality of UCIs to the base station.

According to an embodiment, when the repeated PUCCH transmission is configured through the same slot as the above-described one slot, transmission of a Physical Uplink Shared Channel (PUSCH) may be indicated through the same slot. In this case, the UE may multiplex and transmit the plurality of UCIs on the PUSCH based on the number of repeated transmissions included in configuration information on the repeated transmission. That is, the plurality of UCIs may be transmitted by piggybacking on the PUSCH.

In this case, the number of repeated transmissions may be reflected in determining the HARQ-ACK codebook size. That is, when determining the HARQ-ACK codebook derived according to the indication value of the downlink assignment index of DCI, the number of PUCCH repetitions configured for the UE is reflected in the HARQ-ACK codebook size determined according to the configured HARQ-ACK codebook determination type so that the final HARQ-ACK codebook size may be determined. In other words, the final HARQ-ACK codebook size may be determined to consider the number of PUCCH repetitions configured for the UE in addition to the configured HARQ-ACK codebook determination type.

Alternatively, as another example, when intra-slot PUCCH repetition-based UCI transmission is indicated through an arbitrary slot in the UE, if PUSCH transmission through the same slot is indicated for the corresponding UE, the UE transmits the PUSCH may be dropped. That is, the UE may be configured to transmit only the UCI through the PUCCH resource for which the repeated transmission is indicated.

According to another embodiment, when transmission of the PUSCH is indicated in the same slot as the one slot, a Downlink Assignment Index (DAI) and a beta offset value included in the DCI may be configured separately. That is, a DAI value indicated through the DCI may be configured to indicate an extended DAI value.

That is, the existing DAI indication method for a UE to which the intra-slot PUCCH repetition is not applied and a new DAI indication method for a UE to which a separate intra-slot PUCCH repetition is applied may be defined. In this case, the new DAI indication method may include a DAI information area having an extended size compared to the existing DAI indication method.

The DAI indication type may be configured by the base station through UE-specific higher layer signaling or MAC control element signaling (CE signaling) or physical layer control signaling (L1 control signaling). Alternatively, the DAI indication type may be determined according to whether the intra-slot PUCCH repetition is applied.

According to another embodiment, a separate beta offset value for UCI transmission based on the intra-slot PUCCH repetition may be defined, and the corresponding beta offset value may be configured in the base station based on this. That is, when the beta offset value for UCI piggyback is configured through the higher layer signaling, the beta offset value for UCI piggyback to which the intra-slot repetition is applied may be configured separately from the beta offset value for UCI piggyback to which the existing intra-slot repetition is not applied.

Accordingly, the method according to the embodiment of the present disclosure may improve reliability and perform efficient transmission of uplink control channels by multiplexing and transmitting a plurality of uplink control information to one PUCCH resource in a case in which repeated transmission of uplink control information is configured in one slot. The method according to the embodiment of the present disclosure may improve reliability and perform efficient transmission of uplink control channels by multiplexing and transmitting a plurality of uplink control information to one PUSCH resource when transmission of PUSCH is indicated in a case in which repeated transmission of uplink control information is configured in one slot.

Figure 11:
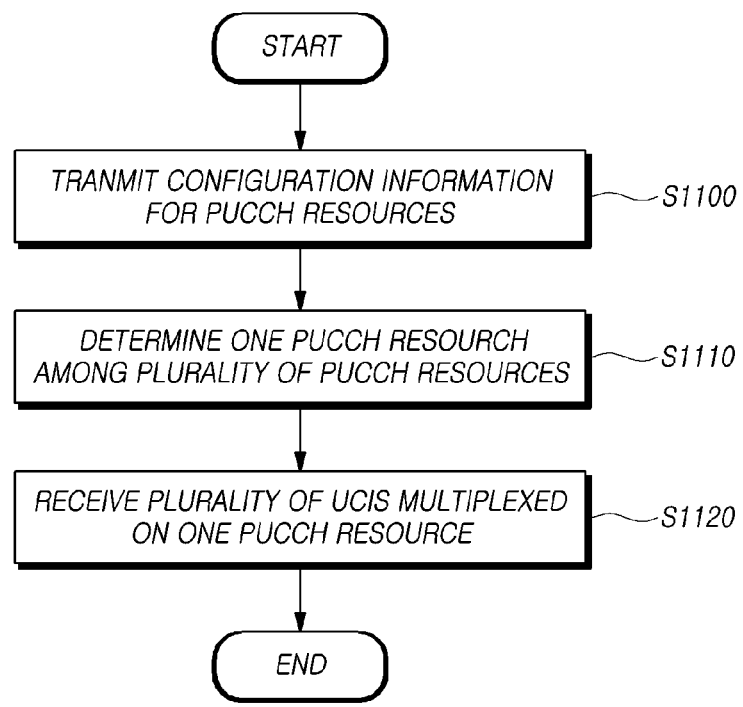
FIG. 11 is a flowchart illustrating a method of a base station for receiving uplink control information according to one embodiment.

FIG. 11 is a block diagram illustrating a process of a base station for receiving uplink control information using a base station according to one embodiment.

Referring to FIG. 11, the base station may transmit configuration information on a plurality of physical uplink control channels (PUCCH) resources allocated to transmission of a plurality of UCIs in one slot at S1100.

The PUCCH resources may be configured to be used for transmitting the UCI for the UE. For example, in order to respectively transmit HARQ ACK/NACK feedback information for a plurality of PDSCHs received from the base station, the plurality of PUCCH resources in one slot may be configured for the UE, respectively.

The base station may transmit configuration information for the plurality of PUCCH resources in one slot configured for the UE to the UE.

Referring back to FIG. 11, the base station may transmit configuration information on repeated transmission for at least one of the plurality of UCIs at S1110.

According to an embodiment, the PUCCH resources for intra-slot PUCCH repetition may be additionally configured. For example, the base station may configure subslot-based PUCCH resources for additionally applying the intra-slot PUCCH repetition in addition to the existing slot-based PUCCH resources for the UE through higher layer signaling.

The base station may transmit configuration information for slot-based PUCCH resources and configuration information for subslot-based PUCCH resources from the base station, respectively. That is, the base station may transmit the configuration information repeated for transmission for at least one of the plurality of UCIs.

In this case, the configuration information for the subslot-based PUCCH resources may additionally include information on the number of repetitions for UCI transmission in addition to the PUCCH resource configuration information configuring the slot-based PUCCH resource set.

According to an embodiment, when the UCI includes HARQ feedback information, the slot-based PUCCH resource set and the subslot-based PUCCH resource set may be configured based on different HARQ-ACK codebooks. That is, in order to support different service types of the UE, at least two HARQ-ACK codebooks may be simultaneously configured. In this case, parameters in the PUCCH configuration related to HARQ-ACK feedback for different HARQ-ACK codebooks may be configured to be distinguished from each other. Identification of the HARQ-ACK codebook may be distinguished by the DCI format, the RNTI of the UE, an explicit indication in DCI, or the core set/search space.

According to an embodiment, when the UE performs the HARQ ACK/NACK feedback for PDSCH reception, whether to apply intra-slot PUCCH repetition for reliability improvement may be explicitly or implicitly signaled by the base station.

The base station may indicate indication information on the intra-slot PUCCH repetition as information indicating the subslot-based PUCCH resources to the UE through explicit higher layer signaling. Alternatively, the base station may transmit indication information on the intra-slot PUCCH repetition as information indicating the subslot-based PUCCH resources to the UE through a DCI format for transmitting PDSCH resource allocation information.

Alternatively, the information indicating the subslot-based uplink control channel resource set may be configured based on a downlink control channel search space or a UE RNTI (Radio Network Temporary Identifier) to be implicitly indicated. That is, the base station may transmit information on the CORESET or the search space or the UE RNTI as information indicating the subslot-based uplink control channel resource set.

Referring back to FIG. 11, the base station may receive the plurality of UCIs multiplexed on one PUCCH resource at S1120.

That is, in the case where each PUCCH resource for transmission of the plurality of UCIs is allocated through one slot, when repeated transmission of some UCI is indicated, the UE may determine one PUCCH resource for multiplexing the plurality of UCIs among the plurality of PUCCH resources. In this case, the priority level of each of the plurality of UCIs for determining one PUCCH resource may be determined based on at least one of whether the PUCCH resource allocated for UCI transmission is configured for repeated transmission or the number of repeated transmissions according to an embodiment.

According to an embodiment, the priority level for UCI multiplexing may be determined according to whether the intra-slot PUCCH repetition for arbitrary UCI transmission is configured or indicated. That is, when configuring UCI transmission to which the intra-slot PUCCH repetition is applied is configured, and PUCCH resources for the UCI multiplexing are determined, PUCCH resources to which the intra-slot PUCCH repetition is applied may have higher priority than PUCCH resources to which intra-slot PUCCH repetition is not applied.

In this case, when the intra-slot PUCCH repetition is configured for one or more UCIs, priorities may be additionally distinguished according to the number of repetitions. If two or more UCI transmissions having the same priority are indicated, that is, if repeated transmission is applied and the number of repetitions is the same, the method of determining PUCCH resources based on the serving cell index and PDCCH monitoring occasion index may be applied.

By applying such a criterion, one PUCCH resource with the highest priority may be determined as a PUCCH resource for multiplexing the UCI.

On the contrary, it may be configured to have a higher priority for a PUCCH resource to which repeated transmission is not applied. Even in this case, when repeated transmission is applied to all UCIs, the priority may be determined according to the number of repetitions. In addition, when there are two or more PUCCH resources of the same priority, the PUCCH resources may be determined based on the above-described serving cell index and PDCCH monitoring occasion index according to the above-described method.

In this way, when a PUCCH resource to which the repeated transmission is not applied and a PUCCH resource having a small number of repetitions are configured to have higher priority, the UCI codebook size for multiplexing and transmitting the UCI through the determined PUCCH resource may be determined as follows. That is, in the case of the UCI in which the repeated transmission is configured in one slot, the actual HARQ-ACK codebook size is multiplied by the number of repetitions so that the HARQ-ACK codebook size when UCI multiplexing is applied may be determined.

The base station may receive the plurality of multiplexed UCIs transmitted from the UE through one PUCCH resource. The UE may multiplex the plurality of UCIs to one PUCCH resource having the highest priority according to the above-described condition among the plurality of PUCCH resources allocated to the plurality of UCI transmissions. The base station may receive a PUCCH multiplexed with the plurality of UCIs from the UE.

According to an embodiment, when the repeated PUCCH transmission is configured through the same slot as the above-described one slot, transmission of a Physical Uplink Shared Channel (PUSCH) may be indicated through the same slot. In this case, the base station may receive the PUSCH on which the plurality of UCIs is multiplexed based on the number of repeated transmissions included in configuration information on the repeated transmission. That is, the plurality of UCIs may be transmitted by piggybacking on the PUSCH.

In this case, the number of repeated transmissions may be reflected in determining the HARQ-ACK codebook size. That is, when determining the HARQ-ACK codebook derived according to the indication value of the downlink assignment index of DCI, the number of PUCCH repetitions configured for the UE is reflected in the HARQ-ACK codebook size determined according to the configured HARQ-ACK codebook determination type so that the final HARQ-ACK codebook size may be determined. In other words, the final HARQ-ACK codebook size may be determined to consider the number of PUCCH repetitions configured for the UE in addition to the configured HARQ-ACK codebook determination type.

According to another embodiment when intra-slot PUCCH repetition-based UCI transmission is indicated through an arbitrary slot in the UE, if PUSCH transmission through the same slot is indicated for the UE, the UE transmits the PUSCH may be dropped. That is, the base station may receive only the UCI through the PUCCH resource for which the repeated transmission is indicated.

According to another embodiment, when transmission of the PUSCH is indicated in the same slot as the one slot, a Downlink Assignment Index (DAI) and a beta offset value included in the DCI may be configured separately. That is, a DAI value indicated through the DCI may be configured to indicate an extended DAI value.

That is, in addition to the typical DAI indication method for a UE to which the intra-slot PUCCH repetition is not applied, a new DAI indication method may be defined for a UE to which a separate intra-slot PUCCH repetition is applied. In this case, the new DAI indication method may include a DAI information area having an extended size compared to the existing DAI indication method.

The DAI indication type may be configured by the base station through UE-specific higher layer signaling or MAC control element signaling (CE signaling) or physical layer control signaling (L1 control signaling). Alternatively, the DAI indication type may be determined according to whether the intra-slot PUCCH repetition is applied.

According to another embodiment, a separate beta offset value may be defined for UCI transmission based on the intra-slot PUCCH repetition, and the corresponding beta offset value may be configured in the base station based on this. That is, when the beta offset value for UCI piggyback is configured through the higher layer signaling, the beta offset value for UCI piggyback to which the intra-slot repetition is applied may be configured separately from the beta offset value for UCI piggyback to which the existing intra-slot repetition is not applied.

Accordingly, the method according to the embodiment of the present disclosure may improve reliability and perform efficient transmission of uplink control channels by multiplexing and transmitting a plurality of uplink control information to one PUCCH resource in a case in which repeated transmission of uplink control information is configured in one slot. The method according to the embodiment of the present disclosure may improve reliability and perform efficient transmission of uplink control channels by multiplexing and transmitting a plurality of uplink control information to one PUSCH resource when transmission of PUSCH is indicated in a case in which repeated transmission of uplink control information is configured in one slot.

Hereinafter, each embodiment related to repeated transmission and multiplexing of uplink control information (UCI) in one slot will be described in detail with reference to the related drawings.

Each embodiment relates to a method for multiplexing and transmitting the plurality of UCIs to one PUCCH in consideration of a case in which the repeated PUCCH transmission is configured through one slot in an NR system as a method for improving reliability for the UCI.

PUCCH resource for transmitting HARQ ACK/NACK feedback information for PDSCH reception of any UE in NR may be indicated through PUCCH resource indicator information area of DCI format including the corresponding PDSCH resource allocation information. For example, a maximum of four PUCCH resource sets for an UE may be configured by the base station, and each PUCCH resource set may be configured with a maximum of 16 PUCCH resources. In addition, the PUCCH resources for HARQ ACK/NACK feedback for the PDSCH reception of any UE are allocated through a PUCCH resource indicator and an implicit mapping scheme.

In NR, it is required to improve the reliability of both the uplink data/control channel and the downlink data/control channel for providing the URLLC service. Accordingly, a method of repeatedly transmitting arbitrary uplink control information through one slot may be applied as a method of improving the reliability of the uplink control channel such as the PUCCH. That is, the intra-slot PUCCH repetition in which the same UCI is repeatedly transmitted through a single slot may be applied.

To this end, an intra-slot PUCCH repetition indication may be defined.

According to an embodiment, when the HARQ ACK/NACK feedback for the PDSCH reception in an UE is performed, intra-slot PUCCH repetition application for reliability improvement may be defined to be signaled explicitly or implicitly by the base station.

For example, the indication information on the intra-slot PUCCH repetition may be explicitly signaled by the base station. That is, the indication information on the intra-slot PUCCH repetition may be configured to semi-static through the UE-specific RRC signaling. Alternatively, the indication information on the intra-slot PUCCH repetition may be applied to activation or deactivation of the intra-slot PUCCH repetition through the MAC control element (CE) signaling. Alternatively, the indication information on the intra-slot PUCCH repetition may be transmitted through the DCI format for transmitting PDSCH resource allocation information. That is, it may be defined to include an information area for indicating whether to apply the corresponding intra-slot PUCCH repetition, for example, an intra-slot PUCCH repetition indicator through the downlink assignment DCI format for transmitting the PDSCH resource allocation information, and it may be defined to indicate whether the base station is dynamically applied to the intra-slot PUCCH repetition through this.

Alternatively, the indication information on the intra-slot PUCCH repetition may be signaled implicitly by the base station. That is, whether to apply the corresponding intra-slot PUCCH repetition may be determined according to a PDSCH transmission duration. For example, when the corresponding PDSCH transmission is slot-based transmission or aggregated slot-based transmission, the corresponding intra-slot PUCCH repetition may not be applied. In contrast, when the corresponding PDSCH transmission is non-slot-based transmission such as mini-slots of 2, 4, 7 symbols and the like, which are units smaller than one slot, the intra-slot PUCCH repetition is applied. Alternatively, when configuring the CORESET or the search space, configuration information on the PUCCH transmission type for the PDSCH allocation may be included through the CORESET or the search space. Here, the PUCCH transmission type may be divided into slot-based PUCCH transmission or subslot-based PUCCH transmission for applying intra-slot PUCCH repetition. In this case, it may be defined to determine whether to apply the corresponding intra-slot PUCCH repetition by the CORESET or the search space in through which the DCI format including any PDSCH resource allocation information is transmitted.

Alternatively, if the RNTI applied to CRC scrambling of the DCI format including resource allocation information for PDSCH is MCS-C-RNTI, it will be configured that the intra-slot PUCCH repetition is applied, and otherwise, the intra-slot PUCCH repetition is not applied. Alternatively, by allocating a separate new RNTI for applying the intra-slot PUCCH repetition, allocation information on PDSCH transmission resources requiring intra-slot PUCCH repetition application may be configured to be implicitly transmitted by performing the CRC scrambling based on the new RNTI.

When the intra-slot PUCCH repetition is applied according to the above content, it is necessary to define a PUCCH resource allocation method repeatedly transmitted through a single slot.

According to an embodiment, it may be defined that a PUCCH resource set for the intra-slot PUCCH repetition is configured separately from the existing PUCCH resource set. That is, the base station may additionally configure the PUCCH resource set (e.g., a type-2 PUCCH resource set) to apply the intra-slot PUCCH repetition in addition to the existing PUCCH resource set (e.g., type-1 PUCCH resource set) to which the intra-slot PUCCH repetition is not applied for any UE through the higher layer signaling.

In this case, the base station indicates PUCCH resource allocation information through the PUCCH resource indicator of the DCI format, and the UE interprets it depending on whether the intra-slot PUCCH repetition is applied. For example, when it is indicated or configured not to apply the intra-slot PUCCH repetition, it may be defined that the base station may indicate the PUCCH resource allocation information based on the type-1 PUCCH resource set and the UE may interpret it. Conversely, when the intra-slot PUCCH repetition is indicated or configured to be applied, it may be defined that the base station indicates the PUCCH resource allocation information based on the new type-2 PUCCH resource set and the UE interprets it.

In addition, the configuration information of the PUCCH resources constituting the type-2 PUCCH resource set may additionally include configuration information on the number of repetitions or a separate time duration or frequency duration allocation information for each intra-slot PUCCH repetition for the slot PUCCH repletion resource configuration in addition to configuration information on the PUCCH resource constituting the type-1 PUCCH resource set. That is, each slot may be divided into sub-slots for the intra-slot PUCCH repetition, and the PUCCH resource allocation information may be configured for each subslot.

According to another embodiment, the intra-slot PUCCH repetition may be defined to be applied based on PUCCH resources constituting the previously allocated PUCCH resource set. In this case, the number of repetitions of the PUCCH and the symbol resource in which each repetition is performed may be defined to be determined as a function of the time duration resource allocation information of the PUCCH resource indicated through the PUCCH resource indicator and the number of uplink symbols constituting the slot in which the PUCCH is transmitted.

Alternatively, it may be defined so that the base station signals information on the number of intra-slot repetitions in addition to the PUCCH resource indicator through the DCI. In this case, it may be defined so that symbol resources in which each repetition is performed may be determined according to the time duration resource allocation information of the PUCCH resource indicated through the PUCCH resource indicator, the number of uplink symbols constituting the slot in which the PUCCH is transmitted, and the indicated number of intra-slot repetition. However, whether or not to include indication information area on the number of intra-slot repetition through the DCI format may be determined depending on whether or not the intra-slot PUCCH repetition according to the embodiment 1 below is configured, or configured by the base station through a UE-specific or cell-specific higher layer signaling.

In this way, in order to improve the reliability of the UE's UCI transmission, for UCI for which transmission is indicated through any one slot in any UE, there may be applied a method of allocating the plurality of PUCCH resources on the time axis within the corresponding slot and repeatedly transmitting the corresponding UCI.

When the plurality of PUCCH resources for the plurality of UCI transmissions are allocated to a certain UE through one slot, and in particular, each PUCCH resource is allocated to be fully or partially overlapped in the time axis, the UE may multiplex and transmit each UCI through one PUCCH resource among the plurality of PUCCH resources.

This multiplexing method corresponds to multiplexing the plurality of UCIs on one PUCCH when one PUCCH resource is allocated for each UCI. Hereinafter, a method for multiplexing and transmitting the plurality of UCIs on the PUCCH when PUCCH repetition through one slot is applied for UCI transmission.

Embodiment 1. PUCCH Resource Determination in Consideration of Whether or not to Repeat and the Number of Repetitions When a plurality of UCI transmissions are configured or indicated in one slot and PUCCH resources for each UCI transmission are allocated separately, or when the corresponding PUCCH resources are also overlapped on the time axis and a processing time condition for the corresponding UCI transmission in the UE is satisfied, the plurality of UCIs are multiplexed and transmitted through one PUCCH resource among the plurality of PUCCH resources.

For convenience of description, as an example, the present disclosure introduces a method of the PUCCH resource determination based on a method of determining one PUCCH resource for multiplexing and transmitting each HARQ-ACK feedback information when each PUCCH resource for each HARQ-ACK reporting for a plurality of PDSCH receptions is allocated through one slot.

According to a typical method for determining PUCCH resource to multiplex the plurality of HARQ-ACK feedback information, the PUCCH resource is determined according to monitoring occasion information of the PDCCH including each PDSCH resource allocation information and the serving cell index information to which the PDCCH is transmitted. Specifically, each DCI format transmitting each PDSCH resource allocation information for a plurality of PDSCH receptions in which PUCCH resource allocation for transmitting HARQ-ACK feedback information through the same slot is performed, is first indexed in ascending order according to the serving cell index and secondary indexed in ascending order according to the PDCCH monitoring occasion index, the plurality of HARQ-ACK feedback information is multiplexed and transmitted through the PUCCH resource indicated through the PUCCH resource indicator information area of the last DCI format.

This typical method of the PUCCH resource determination does not consider the intra-slot PUCCH repetition for increasing the reliability of UCI transmission. Therefore, the present disclosure introduces a method of determining a PUCCH resource in consideration of the intra-slot PUCCH repetition when the intra-slot PUCCH repetition is configured or indicated for transmission of any one or more of the plurality of UCIs.

Specifically, when determining the PUCCH resource, whether or not intra-slot PUCCH repetition is applied in the corresponding slot or the number of PUCCH repetitions corresponding thereto may be considered as an additional parameter.

According to an embodiment, as described above, when each HARQ-ACK feedback information for the plurality of PDSCH receptions is indicated to be transmitted through the same slot, it may be defined to determine a priority level for UCI multiplexing according to whether the intra-slot PUCCH repetition for any HARQ-ACK feedback information transmission is configured or indicated. That is, when HARQ-ACK feedback information transmission to which the intra-slot PUCCH repetition is applied is configured or indicated and the PUCCH resource for UCI multiplexing is determined, the PUCCH resource to which intra-slot PUCCH repetition is applied may have a higher priority compared to the PUCCH resource to which the intra-slot PUCCH repetition is not applied.

In addition, when the intra-slot PUCCH repetition configured or indicated for one or more UCIs, it may be defined to additionally divide the priority according to the number of corresponding PUCCH repetitions. For example, as the number of PUCCH repetitions increases, it may be defined to have a higher priority for PUCCH resource determination.

However, when indicating UCI transmission to which the intra-slot PUCCH repetition of two or more of the same priority level is applied, that is, when the intra-slot PUCCH repetition is applied and the number of repetitions is the same, the PUCCH resource determination rule described above based on the serving cell index and the PDCCH monitoring occasion index may be followed.

According to another embodiment, contrary to the above, when determining PUCCH resource for UCI multiplexing for PUCCH resource to which the intra-slot repetition is not applied, it may be defined to have a higher priority. That is, contrary to the above, when it is indicated to transmit each HARQ-ACK feedback information for a plurality of PDSCH receptions in an one slot, respectively, when a PUCCH resource for transmitting the corresponding HARQ-ACK feedback information is allocated, and when the PUCCH resource allocation without the intra-slot PUCCH repetition applied coexists with the PUCCH resource allocation with the intra-slot PUCCH repetition applied, the PUCCH resource without the intra-slot PUCCH repetition applied may have a higher priority level for the PUCCH resource determination for UCI multiplexing.

If the intra-slot PUCCH repetition is applied to all UCIs, a PUCCH resource with a small number of repetitions or a big number of repetitions may have a higher priority level for determining PUCCH resource for UCI multiplexing.

In addition, when there are two or more PUCCH resources of the same priority level, the PUCCH resource determination rule described above based on the serving cell index and PDCCH monitoring occasion index may be allowed.

As such, when i) the PUCCH resource to which the intra-slot PUCCH repetition is not applied and ii) the PUCCH resource with a small number of repetitions have a higher priority level for determining the PUCCH resource for UCI multiplexing, the UCI codebook size for multiplexing and transmitting the UCI through the determined PUCCH resource may be determined as follows. That is, in the case of the UCI in which the intra-slot PUCCH repetition is configured or indicated, the HARQ-ACK codebook size for UCI multiplexing is determined as a value obtained by multiplying the actual HARQ-ACK codebook size by the number of intra-slot PUCCH repetitions or in proportion to the number of repetitions.

In addition to the above-described embodiment 1, when determining PUCCH resource for the plurality of UCI multiplexing, the scope of the present disclosure may include all of the cases in which whether or not intra-slot PUCCH repetition is applied or the number of PUCCH repetitions is used as one parameter.

Additionally, when determining whether to satisfy the processing time condition for determining whether to multiplex the above-described UCI, in the case of UCI transmission to which the intra-slot PUCCH repetition is applied, it may be defined to determine whether or not the corresponding processing time condition is satisfied based on the first PUCCH resource among the PUCCH resources allocated for the repetition, that is, the first PUCCH resource in the time domain.

In the above, the method for determining the PUCCH resource has been described on the premise of the case of HARQ-ACK feedback information among UCI types, but for example, the method described above may be substantially identically or similarly applied to other UCI types such as CSI feedback and SR.

According to the above-described embodiment 1, in the case where the repeated transmission of the uplink control information is configured in one slot, reliability for PUCCH is improved and efficient transmission is performed by multiplexing and transmitting the plurality of uplink control information on one PUCCH resource.

In addition, the present disclosure introduces a UCI piggyback scheme through a corresponding PUSCH when the repeated PUCCH transmission is configured through one slot and PUSCH transmission is indicated through the same slot.

As a method for improving the reliability of UCI transmission of the UE, for UCI for which transmission is indicated through any one slot in any UE, there may be applied a method of allocating the plurality of PUCCH resources on the time axis within the corresponding slot and repeatedly transmitting the UCI. However, when PUSCH transmission for the corresponding UE is indicated in the corresponding slot, the UCI may be transmitted by piggybacking the corresponding UCI to the PUSCH according to the existing UCI piggyback rule. In this case, it may be difficult to improve the reliability of the corresponding UCI according to the existing UCI piggyback rule.

The present disclosure introduces a method of newly defining a PUSCH piggyback rule for the UCI in which the repeated transmission is indicated through a slot.

Embodiment 2-1. HARQ-ACK Codebook Determination

When the PUSCH is piggybacked and transmitted, it may be defined to reflect the number of repeated transmissions in determining the HARQ-ACK codebook size. That is, when determining the HARQ-ACK codebook derived according to the indication value of the downlink assignment index (DAI) of the DCI, it may be defined to determine the final HARQ-ACK codebook size by reflecting the number of PUCCH repetitions configured or indicated for the UE in addition to the HARQ-ACK codebook size determined according to the configured HARQ-ACK codebook determination type.

According to an embodiment, the final HARQ-ACK codebook size may be determined in proportion to i) the HARQ-ACK codebook size primarily determined according to the HARQ-ACK codebook determination type and the DL assignment index value indicated through DCI and ii) the value of the number of PUCCH repetition for the corresponding UCI transmission configured or indicated by the base station. Here, the HARQ-ACK codebook determination type may include semi-static HARQ-ACK codebook determination corresponding to type-1 or dynamic HARQ-ACK codebook determination corresponding to type-2.

For example, it may be defined to determine the final HARQ-ACK codebook size that is piggybacked to the final PUSCH by multiplying the number of intra-slot PUCCH repetition of the corresponding UCI to the HARQ-ACK codebook size determined primarily according to the DAI value indicated through the HARQ-ACK codebook determination type and the DCI.

However, this HARQ-ACK codebook determination may be limited to be applied only when the PUSCH transmission through the same slot is indicated for the UCI transmitted based on the corresponding intra-slot PUCCH repetition, and the corresponding UCI is piggybacked to PUSCH and transmitted. That is, the HARQ-ACK codebook determination may be defined as follow: i) when the HARQ-ACK feedback information configured or indicated to be repeatedly transmitted through one slot is repeatedly transmitted through the PUCCH, the corresponding HARQ-ACK codebook is determined by the DAI index value and ii) only when determining the HARQ-ACK codebook for deriving resource elements for the HARQ-ACK transmission within the PUSCH resource when it is piggybacked to the PUSCH and transmitted, the corresponding HARQ-ACK codebook is determined in proportion to the number of repetitions configured or indicated as described above.

Embodiment 2-2. PUSCH Dropping

As another method, in the case of which the intra-slot PUCCH repetition-based UCI transmission is indicated through a slot in an UE, if the PUSCH transmission through the same slot is indicated for the corresponding UE, the corresponding UE may drop the PUSCH. That is, it may be defined that the UE may transmit only the UCI through the PUCCH resource for which the repeated transmission is indicated.

Embodiment 2-3. Indication of Extended DL Assignment Index

As another method, in indicating the DAI value through the DCI, it may be defined to indicate an extended DAI value. That is, it is possible to define a new DAI indication method for a UE to which a separate intra-slot PUCCH repetition is applied (referred to as a type-2 DAI indication method for convenience of explanation in the present disclosure), in addition to the typical DAI indication method for a UE to which the intra-slot PUCCH repetition is not applied (referred to as a type-1 DAI indication method for convenience of explanation in the present disclosure).

In this case, the new type-2 DAI indication method may need to indicate a DAI information area having an extended size compared to the typical DL assignment index indication method. Accordingly, the type-2 DL assignment index indication method may be defined to indicate the extended size by including the DAI information area having the extended size compared to the existing DAI information area size according to the HARQ-ACK codebook determination configuration.

However, the DAI indication type may be configured or indicated by the base station through the UE-specific higher layer signaling or the MAC control element signaling (CE signaling) or the physical layer control signaling (L1 control signaling). Alternatively, the DAI indication type may be defined to be determined depending on whether the intra-slot PUCCH repetition is applied.

Embodiment 2-4. Enhancement of Beta Offset ($\beta_{offset}^{HARQ}$-ACK)

As another method, a separate beta offset value may be defined for the UCI transmission based on the intra-slot PUCCH repetition. Based on this, the base station may configure or indicate the corresponding beta offset value. That is, when the beta offset value for UCI piggyback is configured through the higher layer signaling, it may be defined to configure separately the beta offset value for the UCI piggyback to which the intra-slot repetition is applied separately from the beta offset value for the existing UCI piggyback to which the intra-slot repetition is not applied.

Alternatively, when the betaOffsetACK-Index1, betaOffsetACK-Index2, and betaOffsetACK-Index3 values indicated through the beta offset indicator of the DCI are configured through the higher layer signaling, values for {betaOffsetACK-Index1, betaOffsetACK-Index2, and betaOffsetACK-Index3} intra-slot repetition for the UCI piggyback where the intra-slot repetition is applied, may be configured separately from values for {betaOffsetACK-Index1, betaOffsetACK-Index2, and betaOffsetACK-Index3} non-repetition for the existing UCI piggyback where the intra-slot repetition is not applied. Accordingly, when the base station indicates the beta offset value to be applied through the beta offset indicator of the DCI and the UE interprets it, it may be defined to apply the values for {betaOffsetACK-Index1, betaOffsetACK-Index2, and betaOffsetACK-Index3} non-repetition or the values for {betaOffsetACK-Index1, betaOffsetACK-Index2, and betaOffsetACK-Index3} intra-slot repetition values depending on whether intra-slot repetition is configured or indicated, respectively.

Additionally, the timeline requirement for applying the PUSCH piggyback may is applied based on the first time duration resource among PUCCH resources allocated for the UCI for which the intra-slot repetition is configured or indicated. That is, the PUCCH within the corresponding slot which the first symbol resource may be allocated. In other words, when N PUCCH resources are allocated for the repeated transmission of the corresponding UCI, it may be defined to determine whether the timeline condition for the PUSCH piggyback is satisfied based on the first PUCCH resource.

The PUSCH piggyback method for the case where the intra-slot PUCCH repetition is configured or indicated for HARQ-ACK feedback among the UCI types has been described above, but it is not limited thereto. As another example, the above-described description may be substantially identically or similarly applied even to a case in which the intra-slot PUCCH repetition for other UCI types such as CSI feedback and SR is configured or indicated.

According to these embodiments, in the case where the repeated transmission of the uplink control information is configured in one slot, when the PUSCH transmission is indicated, the plurality of uplink control information is multiplexed and transmitted to the PUSCH resources, thereby improving the reliability of the PUCCH and performing the efficient transmission.

Hereinafter, configurations of a UE and a base station capable of performing some or all the embodiments described with reference to FIGS. 1 to 11 will be described with reference to drawings.

Figure 12:
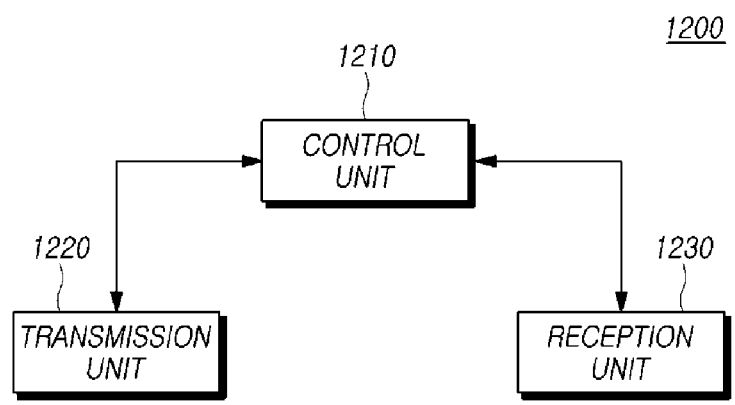
FIG. 12 is a block diagram illustrating a UE according to an embodiment.

FIG. 12 is a block diagram illustrating a UE according to an embodiment.

Referring to FIG. 12, the UE 1200 according to an embodiment includes a controller 1210, a transmitter 1220, and a receiver 1230.

The controller 1210 controls an overall operation of the UE 1200 for performing a method of transmitting uplink control information according to an embodiment. The transmitter 1220 transmits uplink control information, data, and a message to a base station through an applicable channel. The receiver 1230 receives downlink control information, data, a message, and the like from the base station through an applicable channel.

The receiver 1230 may receive configuration information on a plurality of physical uplink control channel (PUCCH) resources allocated to transmission of the plurality of UCIs in one slot from the base station.

The PUCCH resources may be configured to be used for transmitting the UCI for the UE. For example, in order to respectively transmit HARQ ACK/NACK feedback information for a plurality of PDSCHs received from the base station, the plurality of PUCCH resources in one slot may be configured for the UE, respectively.

In addition, the PUCCH resources for intra-slot PUCCH repetition may be additionally configured. For example, the base station may configure subslot-based PUCCH resources for additionally applying the intra-slot PUCCH repetition in addition to the existing slot-based PUCCH resources for the UE through higher layer signaling.

The receiver 1230 may receive configuration information for slot-based PUCCH resources and configuration information for subslot-based PUCCH resources from the base station, respectively. In this case, the configuration information for the subslot-based PUCCH resources may additionally include information on the number of repetitions for UCI transmission in addition to the PUCCH resource configuration information configuring the slot-based PUCCH resource set.

The controller 1210 may determine one PUCCH resource among the plurality of PUCCH resources based on a priority level of each of the plurality of UCIs. According to an embodiment, when the UE performs the HARQ ACK/NACK feedback for PDSCH reception, whether to apply intra-slot PUCCH repetition for reliability improvement may be explicitly or implicitly signaled by the base station.

The receiver 1230 may receive indication information on the intra-slot PUCCH repetition as information indicating the subslot-based PUCCH resources from the base station through explicit higher layer signaling. Alternatively, the receiver 1230 may receive indication information on the intra-slot PUCCH repetition as information indicating the subslot-based PUCCH resources from the base station through a DCI format for transmitting PDSCH resource allocation information.

In the case where each PUCCH resource for transmission of the plurality of UCIs is allocated through one slot, when repeated transmission of some UCI is indicated, the controller 1210 may determine one PUCCH resource for multiplexing the plurality of UCIs among the plurality of PUCCH resources. In this case, as an example, the priority level of each of the plurality of UCIs for determining one PUCCH resource may be determined based on at least one of whether the PUCCH resource allocated for UCI transmission is configured for repeated transmission or the number of repeated transmissions.

The control unit 1210 may determine the priority level for UCI multiplexing according to whether the intra-slot PUCCH repetition for a UCI transmission is configured or indicated. In this case, when the intra-slot PUCCH repetition is configured for one or more UCIs, priorities may be additionally distinguished according to the number of repetitions. If two or more UCI transmissions having the same priority are indicated, that is, if repeated transmission is applied and the number of repetitions is the same, the method of determining PUCCH resources based on the serving cell index and PDCCH monitoring occasion index may be applied.

The transmitter 1220 may multiplex and transmit the plurality of UCIs on one PUCCH resource. The transmitter 1220 may multiplex the plurality of UCIs to one PUCCH resource having the highest priority according to the above-described condition among a plurality of PUCCH resources allocated to a plurality of UCI transmissions. The transmitter 1220 may transmit the PUCCH multiplexed with the plurality of UCIs to the base station.

According to an embodiment, when the repeated PUCCH transmission is configured through the same slot as the above-described one slot, transmission of a Physical Uplink Shared Channel (PUSCH) may be indicated through the same slot. In this case, the transmitter 1220 may multiplex and transmit the plurality of UCIs on the PUSCH based on the number of repeated transmissions included in configuration information on the repeated transmission. That is, the plurality of UCIs may be transmitted by piggybacking on the PUSCH.

According to another embodiment, when intra-slot PUCCH repetition-based UCI transmission is indicated through a slot in the UE, if PUSCH transmission through the same slot is indicated for the corresponding UE, the transmitter 1220 may drop the PUSCH. That is, the UE may be configured to transmit only the UCI through the PUCCH resource for which the repeated transmission is indicated.

As another example, when transmission of the PUSCH is indicated in the same slot as the one slot, a Downlink Assignment Index (DAI) and a beta offset value included in the DCI may be configured separately. That is, a DAI value indicated through the DCI may be configured to indicate an extended DAI value. Alternatively, a separate beta offset value for UCI transmission based on the intra-slot PUCCH repetition may be defined, and the corresponding beta offset value may be configured in the base station based on this.

Accordingly, the UE according to the embodiment of the present disclosure may improve reliability and perform efficient transmission of uplink control channels by multiplexing and transmitting a plurality of uplink control information to one PUCCH resource in a case in which repeated transmission of uplink control information is configured in one slot. The UE according to the embodiment of the present disclosure may improve reliability and perform efficient transmission of uplink control channels by multiplexing and transmitting a plurality of uplink control information to one PUSCH resource when transmission of PUSCH is indicated in a case in which repeated transmission of uplink control information is configured in one slot.

Figure 13:
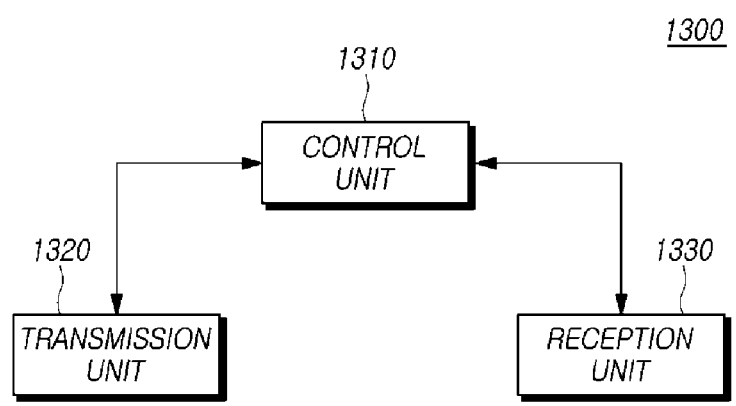
FIG. 13 is a block diagram illustrating a base station according to an embodiment.

FIG. 13 is a block diagram illustrating a base station 1300 according to a further an embodiment.

Referring to FIG. 13, the base station 1300 according to an embodiment includes a controller 1310, a transmitter 1320, and a receiver 1330.

The controller 1310 controls an overall operation of the base station 1300 for performing a method of receiving uplink control information according to an embodiment. The transmitter 1320 and the receiver 1330 are used for transmitting/receiving signals, messages, and data required for performing the present invention described above to/from a UE.

The transmitter 1320 may transmit configuration information on a plurality of physical uplink control channels (PUCCH) resources allocated to transmission of a plurality of UCIs in one slot.

The controller 1310 may configure PUCCH resources to be used for transmitting the UCI to the UE. For example, in order to respectively transmit HARQ ACK/NACK feedback information for a plurality of PDSCHs received from the base station, the plurality of PUCCH resources in one slot may be configured for the UE, respectively.

The transmitter 1320 may transmit configuration information for the plurality of PUCCH resources in one slot configured for the UE to the UE.

The transmitter 1320 may transmit configuration information on repeated transmission for at least one of the plurality of UCIs.

According to an embodiment, the controller 1310 may additionally configure the PUCCH resources for intra-slot PUCCH repetition. For example, the base station may configure subslot-based PUCCH resources for additionally applying the intra-slot PUCCH repetition in addition to the existing slot-based PUCCH resources for the UE through higher layer signaling.

The transmitter 1320 may transmit configuration information for slot-based PUCCH resources and configuration information for subslot-based PUCCH resources from the base station, respectively. That is, the base station may transmit the configuration information repeated for transmission for at least one of the plurality of UCIs In this case, the configuration information for the subslot-based PUCCH resources may additionally include information on the number of repetitions for UCI transmission in addition to the PUCCH resource configuration information configuring the slot-based PUCCH resource set.

According to an embodiment, when the UE performs the HARQ ACK/NACK feedback for PDSCH reception, whether to apply intra-slot PUCCH repetition for reliability improvement may be explicitly or implicitly signaled by the transmitter.

The transmitter 1320 may indicate indication information on the intra-slot PUCCH repetition as information indicating the subslot-based PUCCH resources to the UE through explicit higher layer signaling. Alternatively, the transmitter 1320 may transmit indication information on the intra-slot PUCCH repetition as information indicating the subslot-based PUCCH resources to the UE through a DCI format for transmitting PDSCH resource allocation information.

Alternatively, the information indicating the subslot-based uplink control channel resource set may be configured based on a downlink control channel search space or a UE RNTI (Radio Network Temporary Identifier) to be implicitly indicated. That is, the base station may transmit information on the CORESET or the search space or the UE RNTI as information indicating the subslot-based uplink control channel resource set.

The receiver 1330 may receive the plurality of UCIs multiplexed on one PUCCH resource. In the case where each PUCCH resource for transmission of the plurality of UCIs is allocated through one slot, when repeated transmission of some UCI is indicated, the UE may determine one PUCCH resource for multiplexing the plurality of UCIs among the plurality of PUCCH resources. In this case, as an example, the priority level of each of the plurality of UCIs for determining one PUCCH resource may be determined based on at least one of whether the PUCCH resource allocated for UCI transmission is configured for repeated transmission or the number of repeated transmissions.

As an example, the priority level for UCI multiplexing may be determined according to whether the intra-slot PUCCH repetition for a UCI transmission is configured or indicated. In addition, when the intra-slot PUCCH repetition is configured for one or more UCIs, priorities may be additionally distinguished according to the number of repetitions. If two or more UCI transmissions having the same priority are indicated, that is, if repeated transmission is applied and the number of repetitions is the same, the method of determining PUCCH resources based on the serving cell index and PDCCH monitoring occasion index may be applied.

By applying such a criterion, one PUCCH resource with the highest priority may be determined as a PUCCH resource for multiplexing the UCI.

The receiving unit 1330 may receive the multiplexed plurality of UCIs transmitted from the UE through one PUCCH resource. The UE may multiplex the plurality of UCIs to one PUCCH resource having the highest priority according to the above-described condition among the plurality of PUCCH resources allocated to the plurality of UCI transmissions. The receiver 1330 may receive a PUCCH multiplexed with the plurality of UCIs from the UE.

According to an embodiment, when the repeated PUCCH transmission is configured through the same slot as the above-described one slot, transmission of a Physical Uplink Shared Channel (PUSCH) may be indicated through the same slot. In this case, the receiver 1330 may receive the PUSCH on which the plurality of UCIs is multiplexed based on the number of repeated transmissions included in configuration information on the repeated transmission. That is, the plurality of UCIs may be transmitted by piggybacking on the PUSCH.

According to another embodiment, when intra-slot PUCCH repetition-based UCI transmission is indicated through a slot in the UE, if PUSCH transmission through the same slot is indicated for the UE, the UE may drop the PUSCH. That is, the receiver 1330 may receive only the UCI through the PUCCH resource for which the repeated transmission is indicated.

According to another embodiment, when transmission of the PUSCH is indicated in the same slot as the one slot, a Downlink Assignment Index (DAI) and a beta offset value included in the DCI may be configured separately. That is, a DAI value indicated through the DCI may be configured to indicate an extended DAI value. In addition, a separate beta offset value for UCI transmission based on the intra-slot PUCCH repetition may be defined, and the corresponding beta offset value may be configured in the base station based on this.

Accordingly, the base station according to the embodiment of the present disclosure may improve reliability and perform efficient transmission of uplink control channels by multiplexing and transmitting a plurality of uplink control information to one PUCCH resource in a case in which repeated transmission of uplink control information is configured in one slot. The base station according to the embodiment of the present disclosure may improve reliability and perform efficient transmission of uplink control channels by multiplexing and transmitting a plurality of uplink control information to one PUSCH resource when transmission of PUSCH is indicated in a case in which repeated transmission of uplink control information is configured in one slot.

The embodiments described above may be supported by standard documents disclosed in at least one of IEEE 802, 3GPP, and 3GPP2 that are radio connection systems. In other words, steps, configurations, and parts that have not been described for clearly disclosing the present technical idea in these embodiments can be supported by the standard documents described above. In addition, all the terms disclosed here can be described using the standard documents disclosed above.

These embodiments described above may be realized by various means. For example, these embodiments may be realized by hardware, firmware, software, a combination thereof, or the like.

In the case of realization by hardware, methods according to these embodiments may be realized by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case of realization by firmware or software, methods according to these embodiments may be realized in the form of devices, processes, functions, or the like performing the functions or the operations described above. A software code may be stored in a memory unit and be driven by a processor. The memory unit described above is positioned inside or outside the processor and can transmit/receive data to/from the processor using various means that have already been known.

In addition, the term such as "system", "processor", "controller", "component", "module", "interface", "model", "unit", or the like described above, generally, may represent computer-related entity hardware, a combination of hardware and software, software, or software that is in the middle of execution. For example, the constituent element described above may be a process driven by a processor, a processor, a controller, a control processor, an entity, an execution thread, a program and/or a computer but are not limited thereto. For example, a controller or an application being executed by a processor and a controller or a processor may be a constituent element. One or more constituent elements may be present inside a processor and/or an execution threshold, and the constituent elements may be positioned in one device (for example, a system, a computing device, or the like) or may be distributed and positioned in two or more devices.

The above description is only exemplary description of the technical idea of the present disclosure, and various modifications and changes can be made by those skilled in the art in a range not departing from essential features of the present technical idea. In addition, these embodiments are not for limiting the technical idea of the present disclosure but for description thereof, and thus, the scope of the present technical idea is not limited to such embodiments. The scope of protection of the present disclosure should be construed based on the following claims, and all technical ideas within the scope of equivalents thereof should be construed as being included within the scope of the present disclosure.

The invention claimed is:

1. A method of transmitting uplink control information (UCI) by a user equipment (UE), the method comprising:
   receiving configuration information on a plurality of physical uplink control channel (PUCCH) resources allocated for transmitting the plurality of UCIs in one slot, wherein each of the plurality of PUCCH resources corresponds to each of the plurality of UCIs;
   determining one PUCCH resource among the plurality of PUCCH resources based on a priority level of each of the plurality of UCIs; and
   multiplexing and transmitting the plurality of UCIs to the one PUCCH resource.

2. The method according to claim 1, wherein the priority level of each of the plurality of UCIs is determined based on at least one of whether the PUCCH resource allocated for UCI transmission is configured for repeated transmission or the number of repeated transmissions.

3. The method according to claim 1, further comprising: multiplexing the plurality of UCIs to a physical uplink shared channel (PUSCH) based on the number of repeated transmissions of the one PUCCH resource when transmission of the PUSCH is indicated in the same slot as the one slot.

4. The method according to claim 1, wherein when the transmission of the PUSCH is indicated in the same slot as the one slot, the transmission of the PUSCH is dropped.

5. The method according to claim 1, wherein when transmission of the PUSCH is indicated in the same slot as the one slot, a downlink assignment index (DAI) and a beta offset value included in downlink control information (DCI) are separately configured.

6. A method of receiving uplink control information by a base station, the method comprising:
   transmitting configuration information on a plurality of physical uplink control channel (PUCCH) resources allocated for transmitting the plurality of UCIs in one slot, wherein each of the plurality of PUCCH resources corresponds to each of the plurality of UCIs;
   transmitting configuration information on repeated transmission for at least one of the UCIs; and
   receiving the UCIs multiplexed to one PUCCH resource, wherein the one PUCCH resource is determined among the plurality of PUCCH resources based on a priority level of each of the plurality of UCIs from the configuration information on the repeated transmission.

7. The method according to claim 6, wherein the priority level of each of the plurality of UCIs is determined based on at least one of i) whether the PUCCH resource allocated for UCI transmission is configured for repeated transmission and ii) the number of repeated transmissions.

8. The method according to claim 6, further comprising: receiving the plurality of UCIs multiplexed to a physical uplink shared channel (PUSCH) based on the number of repeated transmissions of the one PUCCH resource when transmission of the PUSCH is indicated in the same slot as the one slot.

9. The method according to claim 6, wherein when the transmission of the PUSCH is indicated in the same slot as the one slot, the transmission of the PUSCH is dropped.

10. The method according to claim 6, wherein when transmission of the PUSCH is indicated in the same slot as the one slot, a downlink assignment index (DAI) and a beta offset value included in downlink control information (DCI) are separately configured.

11. A user equipment (UE) for transmitting uplink control information (UCI), the UE comprising:
a receiver configured to receive configuration information on a plurality of physical uplink control channel (PUCCH) resources allocated for transmitting the plurality of UCIs in one slot, wherein each of the plurality of PUCCH resources corresponds to each of the plurality of UCIs;
a controller configured to determine one PUCCH resource among the plurality of PUCCH resources based on a priority level of each of the plurality of UCIs; and
a transmitter configured to multiplex and transmit the plurality of UCIs to the one PUCCH resource.

12. The UE according to claim 11, wherein the priority level of each of the plurality of UCIs is determined based on at least one of i) whether the PUCCH resource allocated for UCI transmission is configured for repeated transmission and ii) the number of repeated transmissions.

13. The UE according to claim 11, wherein the transmitter multiplexes the plurality of UCIs to a physical uplink shared channel (PUSCH) based on the number of repeated transmissions of the one PUCCH resource when transmission of the PUSCH is indicated in the same slot as the one slot.

14. The UE according to claim 11, wherein when the transmission of the PUSCH is indicated in the same slot as the one slot, the transmission of the PUSCH is dropped.

15. The UE according to claim 11, wherein when transmission of the PUSCH is indicated in the same slot as the one slot, a downlink assignment index (DAI) and a beta offset value included in downlink control information (DCI) are separately configured.

* * * * *